United States Patent
Brown

(10) Patent No.: US 8,639,931 B2
(45) Date of Patent: Jan. 28, 2014

(54) ACCELERATION OF KEY AGREEMENT PROTOCOLS

(75) Inventor: Daniel R. L. Brown, Mississauga (CA)

(73) Assignee: Certicom Corp., Mississauga, Ontario (CA)

(*) Notice: Subject to any disclaimer, the term of this patent is extended or adjusted under 35 U.S.C. 154(b) by 743 days.

(21) Appl. No.: 12/639,710

(22) Filed: Dec. 16, 2009

(65) Prior Publication Data

US 2010/0153728 A1 Jun. 17, 2010

Related U.S. Application Data

(60) Provisional application No. 61/122,936, filed on Dec. 16, 2008.

(51) Int. Cl.
| | |
|---|---|
| H04L 9/32 | (2006.01) |
| H04L 29/06 | (2006.01) |
| G06F 15/16 | (2006.01) |
| H04K 1/00 | (2006.01) |
| H04L 9/00 | (2006.01) |

(52) U.S. Cl.
USPC ............ 713/171; 713/158; 713/169; 726/5; 726/10; 380/28; 380/30; 380/44

(58) Field of Classification Search
USPC ............... 380/28–30, 44–47, 255–286; 713/150–154, 160–167, 189–193
See application file for complete search history.

(56) References Cited

U.S. PATENT DOCUMENTS

| | | | |
|---|---|---|---|
| 5,761,305 A | 6/1998 | Vanstone et al. | |
| 5,889,865 A | 3/1999 | Vanstone et al. | |
| 5,896,455 A | 4/1999 | Vanstone et al. | |
| 6,122,736 A | 9/2000 | Vanstone et al. | |
| 7,340,600 B1* | 3/2008 | Corella | 713/155 |
| 7,908,482 B2* | 3/2011 | Lauter et al. | 713/171 |
| 2003/0123668 A1* | 7/2003 | Lambert et al. | 380/277 |

FOREIGN PATENT DOCUMENTS

| | | |
|---|---|---|
| CA | 2306282 A1 | 4/1999 |
| CA | 2550362 A1 | 12/2006 |
| JP | 2008-527865 A | 5/2003 |
| JP | 2003-131568 A | 7/2008 |
| WO | WO 2006/084896 A1 | 8/2006 |

OTHER PUBLICATIONS

Guide to Elliptic Curve Cryptography; Darrel Hankerson et al.; Springer; 2004; p. 1-332.*

Engel, Lawrence J.; International Search Report from corresponding PCT Application No. PCT/CA2009/001846; Search completed Apr. 19, 2010.

(Continued)

*Primary Examiner* — Evans Desrosiers

(74) *Attorney, Agent, or Firm* — Fish & Richardson P.C.

(57) ABSTRACT

The generation of a shared secret key K in the implementation of a key agreement protocol, for example MQV, may be optimized for accelerated computation by selecting the ephemeral public key and the long-term public key of a correspondent to be identical. One correspondent determines whether the pair of public keys of the other correspondent are identical. If it is, a simplified representation of the shared key K is used which reduces the number of scalar multiplication operations for an additive group or exponentiation operations for a multiplicative group. Further optimization may be obtained by performing simultaneous scalar multiplication or simultaneous exponentiation in the computation of K.

18 Claims, 16 Drawing Sheets

(56) References Cited

OTHER PUBLICATIONS

Law, L. et al. ""An Efficient Protocol for Authenticated Key Agreement""; Technical Reports CORR 98-05; Mar. 1998; http://download.certicom.com/pdfs/corr98-05.pdf.

Okamoto, T.; "Kagi Kokan: Gendai Angou No Tanjou To Sono Hatten [Key Exchanging: Birth of Current Cryptography and its Development]"; 2008; Fundamentals Review; vol. 1, No. 4; pp. 70 to 76; Institute of Electronics, Information and Communication Engineers; https://www.jstage.jst.go.jp/article/essfr/1/4/1_4_4_70/_pdf.

"ECMQVS (Elliptic Curve MQV Scheme) in SEC1"; Jan. 12, 2001; pp. 1 to 15; http://www.ipa.go.jp/security/enc/CRYPTREC/fy15/doc/144b_ECMQVS_1.pdf.

Office Action issued in CA Application No. 2,746,830 on Jul. 22, 2013; 4 pages.

Office Action issued in Chinese Application No. 200980156789.7 on Sep. 27, 2013; 7 pages.

\* cited by examiner

ACCELERATION OF KEY AGREEMENT PROTOCOLS

CROSS-REFERENCE TO RELATED APPLICATIONS

This application claims priority from U.S. Application No. 61/122,936 filed on Dec. 16, 2008, the contents of which are incorporated herein by reference.

TECHNICAL FIELD

The following relates to cryptographic systems, and more particularly to a method and apparatus for computing a shared secret key.

DESCRIPTION OF THE PRIOR ART

Public key cryptography is used to provide security for information transmitted over public networks. Numerous cryptographic protocols are available to provide security, integrity and authentication. Their security is based on the apparent intractability of certain mathematical problems, such as integer factorization and the discrete logarithm problem. These usually have limited computing power and battery power available. Public key schemes sometimes require more computing power than is available. In most cryptographic systems, parameters with a larger number of bits provide greater security but usually incur a penalty of a decrease in speed. In such environments, elliptic curve cryptography (ECC) is particularly appealing since it provides the requisite level of security with parameters having a smaller number of bits relative to other cryptographic systems, such as RSA. Computations are correspondingly faster because of the smaller amount of data that must be manipulated. Security is a requirement in constrained environments, such as mobile computing devices, including cellular phones, pagers, and smart cards. Given the continuing demand for enhanced security, there is a continual need to optimize cryptographic operations to run as quickly as possible and thereby make higher security implementations of existing protocols feasible.

Digital signatures are a class of cryptographic protocols used to provide authentication. As in all public key systems, a sender has a private key and a corresponding public key that are related to one another mathematically. The public key is made available and authenticated to other users through a certificate or a directory. The sender signs a message using their private key, and a recipient is able to verify the signature by using the authentic public key. Such systems are based on a "hard" mathematical problem, such as the factoring of numbers produced by products of large primes or the difficulty of taking logs in a finite field. The difficulty of the underlying problem provides assurance that only the owner of the private key could generate a signature that will verify using the owner's public key.

The users are computing devices that exchange information over a data communication network and are generally referred to as correspondents. The correspondents are colloquially referred to by personal names Alice, Bob, etc. for ease of description.

It is often of interest to share a secret key between two users of a public key cryptosystem that may then be used in a symmetric key encryption scheme to exchange encrypted data. Symmetric key protocols are faster at encrypting data than public key protocols, but establishment of a shared secret key between the correspondents is challenging. Public key cryptosystems may be used to establish a shared key so that a pair of correspondents' may establish a common secret key. This secret key can be used to secure future communications using a symmetric key scheme. One class of key establishment protocols is a key transport protocol, where a single initiator creates the secret key and securely transfers it to the recipients. Another class of key establishment protocol is a key agreement protocol, where all participating entities contribute information which is used to derive the shared secret key.

BRIEF DESCRIPTION OF THE DRAWINGS

Embodiments will now be described by way of example only with reference to the appended drawings wherein.

DETAILED DESCRIPTION OF THE INVENTION

Figure 1:
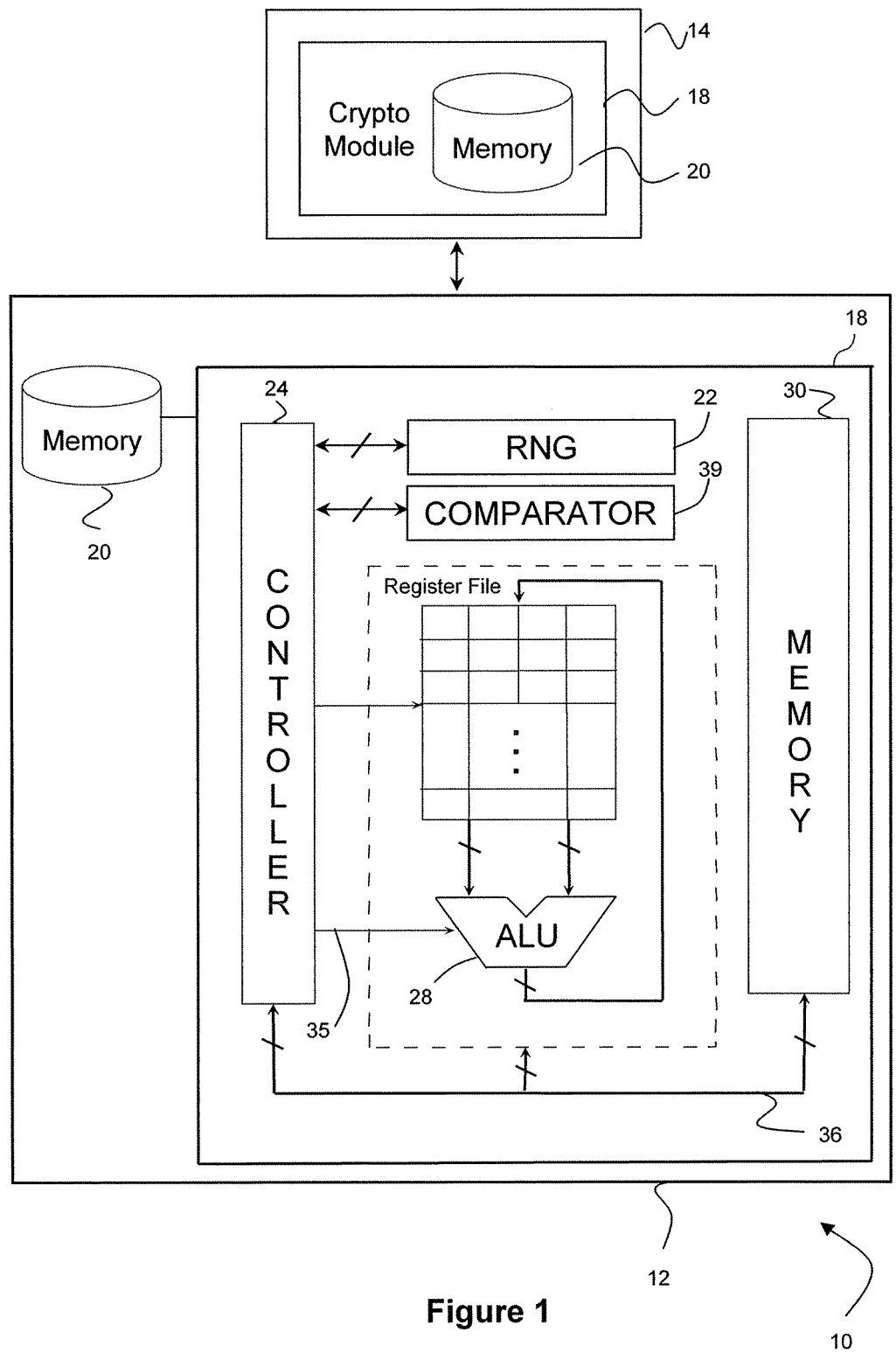
FIG. 1 is a schematic representation of a cryptographic system.

The MQV (Menezes, Qu, Vanstone) protocol belongs to the family of key agreement protocols, which provides a method of sharing a key between two users of a public key cryptosystem and that provides authentication of the key. This protocol is described in U.S. Pat. No. 5,761,305, U.S. Pat. No. 5,889,865, U.S. Pat. No. 5,896,455, and U.S. Pat. No. 6,122,736.

It has a number of variants, some of which are standardized, and therefore is used as a basis for the following description. The MQV key agreement protocol may be implemented in both multiplicative groups defined over a finite field, or using additive groups, such as elliptic curve groups. The general algorithm remains similar in both cases. Notation for MQV is given in the table below.

| Term | Meaning |
|---|---|
| $k_A$ | Alice's ephemeral private key |
| $k_B$ | Bob's ephemeral private key |
| $R_A$ | Alice's ephemeral public key |
| $R_B$ | Bob's ephemeral public key |
| $d_A$ | Alice's long-term private key |
| $d_B$ | Bob's long-term private key |
| $Q_A$ | Alice's long-term public key |
| $Q_B$ | Bob's long-term public key |
| $s_A$ | An intermediate component of the key computed by Alice |
| $s_B$ | An intermediate component of the key computed by Bob |

A multiplicative group version of the MQV protocol is described below. Specifically, a pair of correspondents Alice and Bob use a two-pass MQV variant to share a key, denoted as K.
1. Alice selects $k_A$ at random from the interval 1 to (q−1), where q is the order of the group.
2. Alice computes $R_A = g^{k_A}$ and sends it to Bob, where g is the group generator.
3. Bob selects $k_B$ at random from the interval 1 to (q−1).
4. Bob computes $R_B = g^{k_B}$ and sends it to Alice.
5. Alice computes $s_A = (k_A + d_A \overline{R}_A) \bmod q$ and the shared secret key becomes $K = (R_B (Q_B)^{\overline{R}_B})^{s_A}$.
6. Bob computes $s_B = (k_B + d_B \overline{R}_B) \bmod q$ and the shared secret key becomes $K = (R_A (Q_A)^{\overline{R}_A})^{s_B}$.

The computationally intense parts of the key agreement protocol are the exponentiations that are performed in determining K.

When the MQV protocol was standardized in the ANSI X9.62 and IEEE P1363 standards, a truncation operation was introduced to make the protocol more efficient. The MQV protocol as standardized uses a truncation operation to reduce the bit length of an exponent, and is denoted by $\overline{X}$.

The use of the truncation operation speeds up computations since the exponent is shorter and it is believed that this truncation does not affect the security of the protocol.

Another version of the MQV protocol is the Elliptic Curve MQV (ECMQV) protocol using the three-pass variant with key confirmation, which is described below.
1. Alice selects $k_A$ at random from the interval 1 to (q−1), where q is the order of the group.
2. Alice computes $R_A = k_A P$ and sends $R_A$ and $Q_A$ to Bob, where P is a point on the curve that generates the elements of the elliptic curve group.
3. Bob performs embedded key validation of $R_A$ to ensure $R_A$ is a point not located at infinity, is an element of the group, and is a point that lies on the elliptic curve.
4. Bob selects $k_B$ at random from the interval 1 to (q−1).
5. Bob computes $R_B = k_B P$ and $s_B = (k_B + d_B \overline{R}_B) \bmod q$ and $K = h s_B (R_A + \overline{R}_A Q_A)$, where h is the cofactor of the group.
6. K is a point having coordinates (x,y) and Bob performs a Key Derivation Function (KDF) using the x-coordinate of K as its input to derive two ancillary keys, $k_1$ and $k_2$. This is denoted as $(k_1, k_2) \leftarrow \text{KDF}(x_K)$.
7. Bob computes tag $t_B$ using Message Authentication Code (MAC). This is denoted as $t_B = \text{MAC}_{k_1}(2, Q_B, Q_A, R_B, R_A)$.
8. Bob sends $t_B$, $Q_B$, $R_B$ to Alice.
9. Alice performs embedded public key validation of $R_B$ to ensure $R_B$ is a point not located at infinite, is an element of the group, and is a point that lies on the elliptic curve.
10. Alice computes $s_A = (k_A + d_A \overline{R}_A) \bmod q$ and $K = h s_A (R_B + \overline{R}_B Q_B)$, where h is the cofactor of the group.
11. Alice computes $(k_1, k_2)$ as described at step 6 above.
12. Alice computes $t = \text{MAC}_{k_1}(2, Q_B, Q_A, R_B, R_A)$ and verifies $t = t_B$.
13. Alice computes $t_A = \text{MAC}_{k_1}(3, Q_B, Q_A, R_B, R_A)$ and sends $t_A$ to Bob.
14. Bob computes $t = \text{MAC}_{k_1}(3, Q_B, Q_A, R_B, R_A)$ and verifies $t = t_A$.
15. The agreed session key then becomes $k_2$.

Similar to the multiplicative group implementation described above, the ECMQV protocol using additive groups is most computationally intensive when implementing scalar multiplications, also referred to as point-multiplications, to determine K.

There are several methods used to increase the efficiency when calculating K, in both the exponentiation and scalar multiplication cases. One method for example, increases algorithm efficiency by organizing the correspondents, Alice and Bob, to compute their respective K values in parallel. This architectural change however, does not reduce the computational intensity.

Referring now to FIG. 1, a cryptographic system 10 generally comprises a first correspondent 12 referred to as "Alice", that communicates with a second correspondent 14 referred to as "Bob", over a communication channel 16. Each correspondent 12,14 is a computing device, such as a computer, server, cell phone, PDA, ATM or the like, that includes processors, memory, power supplies, input and output devices necessary to perform the designated functions. Each correspondent 12,14 includes a cryptographic module 18, which either has its own memory 20 for storing inputs, outputs and intermediate portions of cryptographic operations, or has access to an external memory 20 that is part of the correspondent (12, 14). It can be seen that in the example shown in FIG. 1, the first correspondent 12 includes a memory 20 external to the cryptographic module 18 and the second correspondent 14 includes memory 20 that is internal to the cryptographic module 18 to illustrate that the capability to store data can be provided in any suitable arrangement. It will also be appreciated that the memory 20 can be external to and accessible (e.g. via a network connection etc.) to the correspondent 12, 14 if necessary or desired.

The cryptographic module 18 is configured to perform cryptographic operations such as encryption/decryption, signing and modular arithmetic, etc. Typically, the cryptographic module 18 includes a random number generator 22, secure storage 30 to store private keys and an arithmetic logic unit ALU 28 to perform cryptographic operations.

It will be appreciated that the memory 30 may comprise all or part of the memory 20 (shown in FIG. 1) or may be provided as a separate component in the cryptographic module 18 as shown. The memory 30 may include random access memory (RAM), read only memory (ROM) and/or any other type of suitable memory structure.

Computational operations of the ALU 28 are controlled via hard-wired or programmed instructions residing in or accessible to a controller 24 and communicated to the ALU 28 via an instruction bus 35. A memory bus 36 is also provided to enable the controller 24 to utilize memory 30 when performing and outputting results of the operations of the ALU 28. The ALU 28 may be used to perform a variety of operations under the direction of controller 24.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the controller 24 or accessible or connectable thereto. Any application or module herein described may be implemented using computer readable/executable instructions that may be stored or otherwise held by such computer readable media.

The cryptographic module also includes a comparator 39 to compare data stored in memory 20.

The correspondents 12, 14, each share parameters of an elliptic curve cryptosystem with an elliptic curve group E defined over finite field Fp. The parameters, which include a base point P, are stored in the memory 30 and accessible to the controller 24. Similar operations can implement elliptic curves over extension fields or higher genus curves, such as hyperelliptic curves.

Each correspondent 12,14 has a long-term private key $d_A$, $d_B$ respectively in the faun of computer readable bit strings representing integers, and a corresponding long-term public key $Q_A$, $Q_B$, respectively. The public keys $Q_A$, $Q_B$ are each a pair of elements in the underlying field that satisfy the equation of the elliptic curve. The pubic keys represent points on the elliptic curve with the elements representing the (x,y) coordinates of the points. Each correspondent 12,14 has access to an authentic copy of the other correspondent's long-term public key, either as a certificate provided from one correspondent to the other, and signed by a certification authority, (CA), or directly from a CA.

It is desired to share a secret key between the correspondents using a key agreement protocol that is exemplified as the MQV protocol. It has now been recognized that the exchange of information between the correspondents required by MQV protocol can be organized to provide efficient computations, especially given certain conditions for the keys.

Specifically, when a first correspondent knows that a short-term public key and long-term public key of the second correspondent are identical in a MQV key agreement exchange, the first correspondent can accelerate the computation of the MQV shared secret key using a single scalar multiplication operation or single exponentiation operation, instead of two operations or a linear combination. The reduced number of intensive computations required to determine the shared secret key K accelerates the MQV protocol.

The ephemeral public key and long-term public key of a correspondent may be identical either unintentionally or intentionally. There may be situations where it is suitable to intentionally set the ephemeral public key to be identical with the long-term public key. For example, there may be situations, such as e-mail, where it is not preferable or feasible for the recipient to send an ephemeral public key and therefore, the ephemeral public key of the recipient is made identical to his long-term public key. In yet another situation, an authenticated public key, also referred to as a certificate, may be required and yet unavailable. For example, a financial bank's on-line server may operate using certificates, while the on-line banking client uses an Internet browser to securely connect to the server without a certificate. The client may not require a certificate to connect with the bank's server because the client's ephemeral key and long-term key are intentionally set to be identical.

Figure 2:
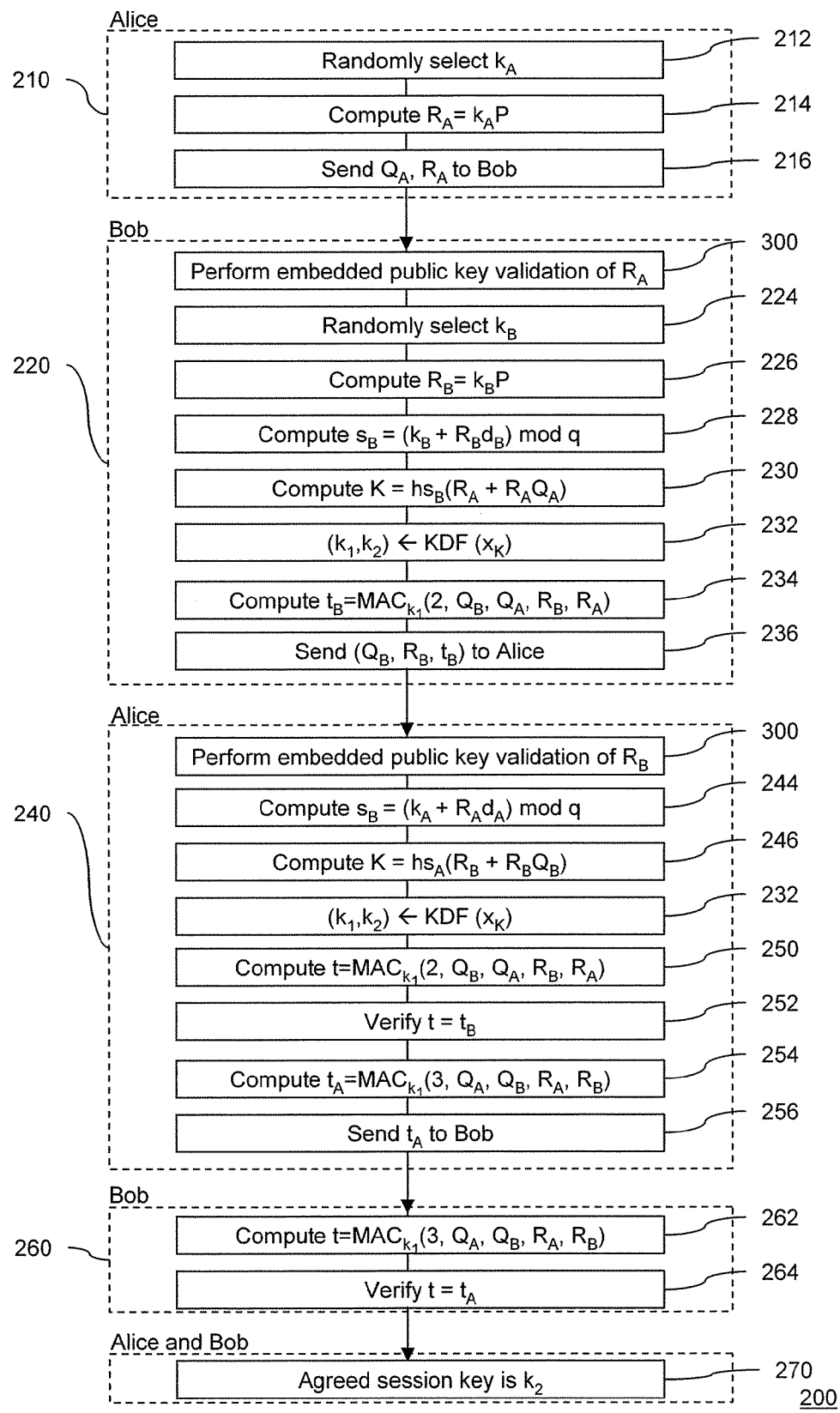
FIG. 2 is a flowchart showing a known method of key agreement using the ECMQV protocol.

A method of computing a shared secret key through the three-pass ECMQV protocol is shown in FIG. 2 generally by numeral 200. The steps shown in FIG. 2 represent the framework within which an acceleration of the ECMQV protocol may be obtained. Assuming there is no acceleration of ECMQV contemplated, Alice initiates the session and implements a set of instructions (210), in which she first randomly selects an integer as an ephemeral private key $k_A$ between 1 to (q−1) (212), where q is the order of the group. She computes her ephemeral public key $R_A$ as a point on the curve according to $R_A = k_A P$ (214), where the point P is a group generator. Alice then sends her long-term public key $Q_A$ and ephemeral public key $R_A$ to Bob (216).

Bob then performs a set of instructions (220). He performs an embedded public key validation (300) on the received public key $R_A$, before randomly selecting his own ephemeral private key, $k_B$, between 1 and (q−1) (224). Embedded key validation is shown in detail in FIG. 3 by numeral 300. First, the public key, in this case $R_A$, is verified according to the condition that $R_A$ is not the point at infinity, i.e. $R_A \neq \infty$ (302). If this condition (302) is true, then the next condition (304) is verified, such that the Cartesian coordinates of $R_A$ are properly represented elements within the finite field $F_q$. Finally, the coordinates of $R_A$ are inserted in to the equation of the elliptic curve to see if $R_A$ lies on the elliptic curve defined by parameters a and b (306). If all conditions are met the algorithm returns "valid" (308). If any of the conditions are not met, then the algorithm returns "invalid" (310).

Returning back to FIG. 2, after Bob validates the key $R_A$ (300) and randomly selects an ephemeral private key, $k_B$ (224), he continues to compute the corresponding ephemeral public key, $R_B$, according to $R_B = k_B P$ (226). This is used to compute intermediate value $s_B = (k_B + d_B \overline{R}_B) \bmod q$ (228). $\overline{R}_B$ is a truncated version of $R_B$ in order to reduce the bit length, thereby increasing computing efficiency. The shared secret key, K, is dependent on $(R_A + \overline{R}_A Q_A)$. As exemplified, the key K is computed according to $K = h s_B (R_A + \overline{R}_A Q_A)$ (230), where h is the cofactor of the group. The x-coordinate of K is used to derive two other secret keys $k_1$ and $k_2$ through a suitable Key Derivation Function (KDF) (232). These secret keys $k_1, k_2$ are used to compute authentication tags using a Message Authentication Code (MAC). Bob uses secret key $k_1$ to compute authentication tag $t_B$ according to $t_B = MAC_{k_1}(2, Q_B, Q_A, R_B, R_A)$ (234). The string "2" is included in the MAC input to indicate that the tag originates from the responder. He then passes parameters $Q_B$, $R_B$, and $t_B$ to Alice (236).

Upon receiving the parameters from Bob, Alice steps through another set of instructions (240). Alice performs embedded public key validation (300) on $R_B$ and then computes intermediate value $s_A = (k_A + d_A \overline{R}_A) \bmod q$ (244). Shared secret key K is dependent on of $(R_B + \overline{R}_B Q_B)$, in this example according to $K = h s_A (R_B + \overline{R}_B Q_B)$ (246). The same KDF is applied to the x-coordinate of K, i.e. $x_K$, such that KDF($x_K$)

gives secret keys $k_1$, $k_2$ (232). Alice computes authentication tag $t=MAC_{k_1}(2, Q_B, Q_A, R_B, R_A)$ (250) and verifies $t=t_B$ (252). If equality of the tags is verified, Alice computes a secondary authentication tag to send to Bob (256), where $t_A=MAC_{k_1}(3, Q_B, Q_A, R_B, R_A)$ (254). The string "3" is included in the MAC input to indicate that the tag originates from the initiator.

In a following set of instructions (260), Bob then computes a corresponding tag $t=MAC_{k_1}(3, Q_B, Q_A, R_B, R_A)$ (262) and verifies that $t=t_A$ (264). In both Alice's and Bob's devices, if condition $t=t_A$ is true, then both secret keys $k_1$ and $k_2$ have been shared. Successful verification of the authentication tags $t_A$ and $t_B$ convinces each entity that the other entity has indeed computed the shared secret key K (since computing the tags requires knowledge of $k_1$ and therefore also of K), that the communications have not been tampered with (assuming that the MAC is secure), and that the other entity knows the identity of the entity with which it is communicating (since the identities are included in the messages that are MACed). After verifying the above conditions, the ECMQV protocol returns the agreed secret session key $k_2$ (270) which was derived from the KDF. The session key $k_2$ may then be used for an exchange of information over the communication channel 16, using a symmetric encryption under the $k_2$.

At any step within the ECMQV protocol, if a verification process does not return "true", the protocol will be terminated.

The most computationally intensive aspect of the ECMQV protocol described above is the scalar multiplication operation, more commonly referred to as point-multiplication. The efficiency of a ECMQV protocol is measured using the number of scalar multiplications required to compute the shared secret key. In the protocol described in FIGS. 2 and 3, Alice performs scalar multiplication to compute $K=hs_A(R_B+\overline{R}_B Q_B)$ (246), and Bob performs scalar multiplication to compute $K=hs_B(R_A+\overline{R}_A Q_A)$ (230). Specifically, both Alice and Bob each perform 1.5 scalar multiplications to compute K in the above format. In the case of Alice, the ALU (28) computes $K=hs_A(R_B+\overline{R}_B Q_B)$ (246). Within the bracket term $(R_B+\overline{R}_B Q_B)$, the multiplication $\overline{R}_B Q_B$ is performed, where $\overline{R}_B$ is an integer and $Q_B$ is a point on the elliptic curve. Since $\overline{R}_B$ has been truncated and has a shorter bit length, the operation $\overline{R}_B Q_B$ costs half of a scalar multiplication, or 0.5 scalar multiplications. The next scalar multiplication occurs when calculating the product between integer $hs_A$ and elliptic curve point $(R_B+\overline{R}_B Q_B)$, which costs 1 full scalar multiplication. Thus, calculating K costs a total of (1+0.5)=1.5 scalar multiplications.

Figure 3:
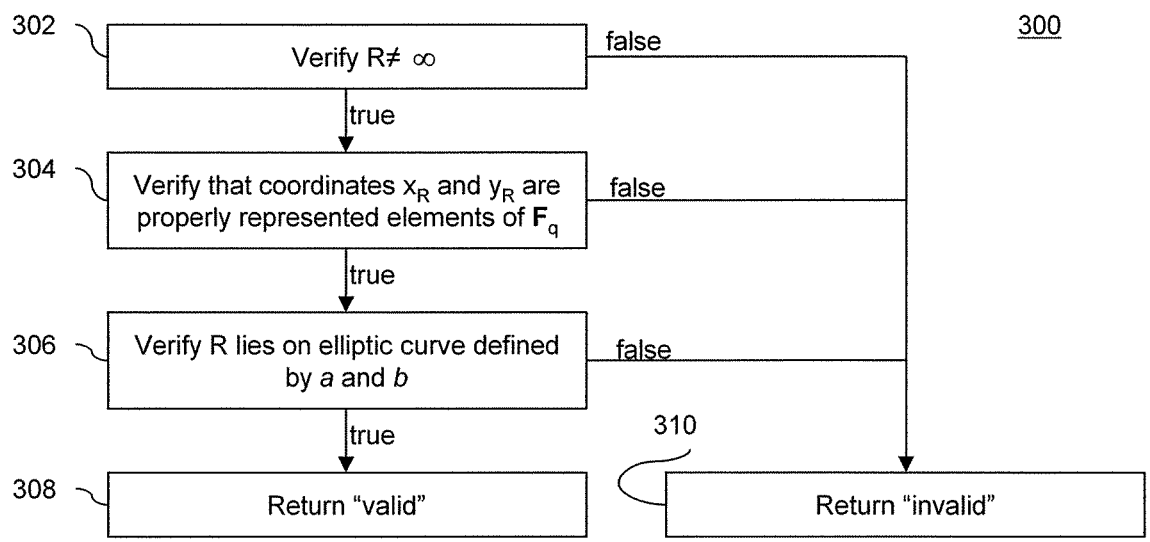
FIG. 3 is a flowchart showing details of an embedded key validation step from FIG. 2.
Figure 4:
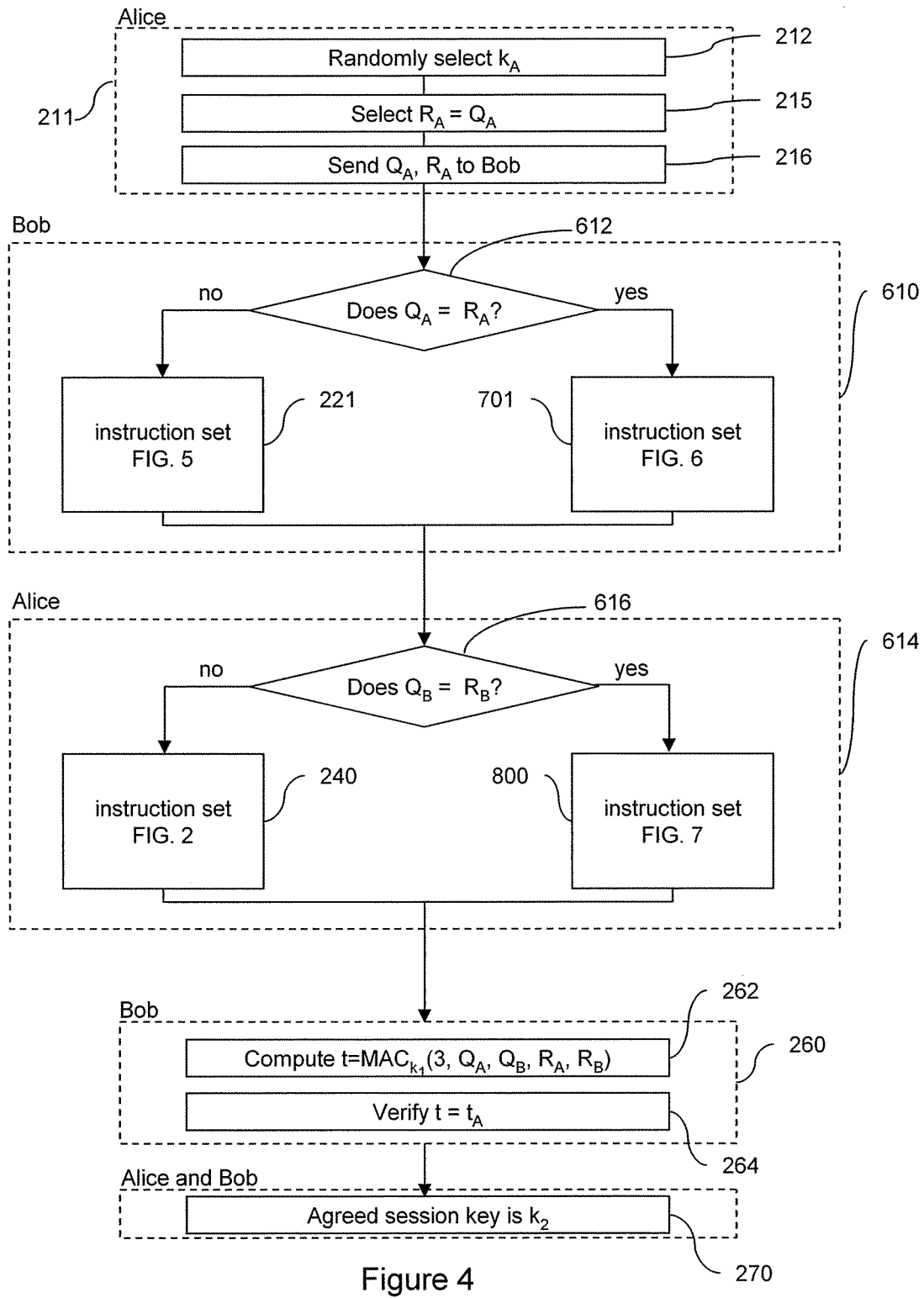
FIG. 4 is a flowchart showing an embodiment of an accelerated key agreement according to ECMQV.

To reduce the number of scalar multiplication, and thereby accelerate the key agreement protocol, the framework of FIG. 3 is adapted as shown in FIG. 4 based on the recognition that scalar multiplication costs may be further reduced when the pair of public keys for a correspondent are equal, such that $R_B=Q_B$ and/or $R_A=Q_A$. For Bob, the accelerated computation occurs when $R_A=Q_A$, which allows the shared secret key computation to simplify and become $K=uQ_A$, where the simplified factor u is dependent on $(1+\overline{R}_A)$. In the particular example, $u=hs_B(1+\overline{R}_A)$. Similarly, for Alice, the accelerated computation occurs when $R_B=Q_B$, which allows the shared secret key computation to simplify and become $K=vQ_B$, where the simplified factor v is dependent on $(1+\overline{R}_A)$. In this example, $v=hs_A(1+\overline{R}_B)$. A scalar multiplication cost of 1.0 is required to compute the shared secret key. Therefore the protocol described in FIG. 4 can be implemented as much as 33% faster than that described in FIG. 3.

Referring to FIG. 4, an embodiment of accelerating an ECMQV protocol by reducing the number of scalar multiplications is shown when it is identified that a pair of identical public keys is used by a correspondent. In this embodiment, both Alice and Bob intentionally set their respective ephemeral public key to be identical to their long-term public key. The accelerated algorithm begins with Alice performing a block of instructions (211), including randomly selecting an ephemeral private key $k_A$ (212), intentionally selecting ephemeral public key $R_A$ to be equal to long-term key $Q_A$ (215), and sending $Q_A$ and $R_A$ to Bob (216).

Figure 5:
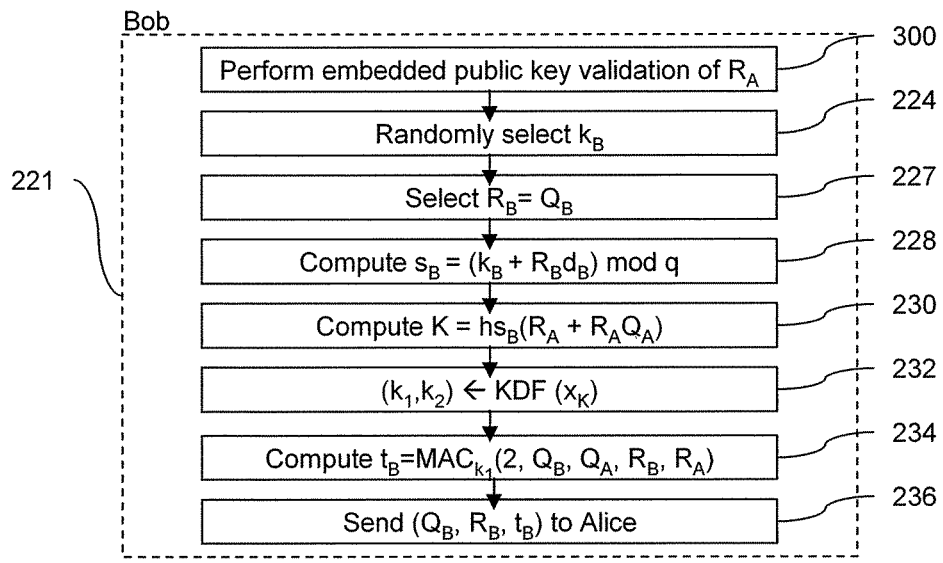
FIG. 5 is a flowchart showing details of the accelerated computation of the shared secret key from FIG. 4 performed by one correspondent.

Upon receiving the pair of public keys, Bob determines whether the keys are identical. As shown in FIG. 4, Bob begins to perform a series of instructions (610) by first comparing $Q_A$ and $R_A$ (612). If $Q_A$ does not equal $R_A$, Bob continues with the set of steps 221. Referring to FIG. 5, the set 221 is shown in more detail. Although set 221 is similar to the series of steps explained previously in the set 220, set 221 does not compute $R_B$ using the ephemeral private key $k_B$. Instead, in the set 221, Bob intentionally selects $R_B$ to equal $Q_B$, as per step 227.

Figure 6:
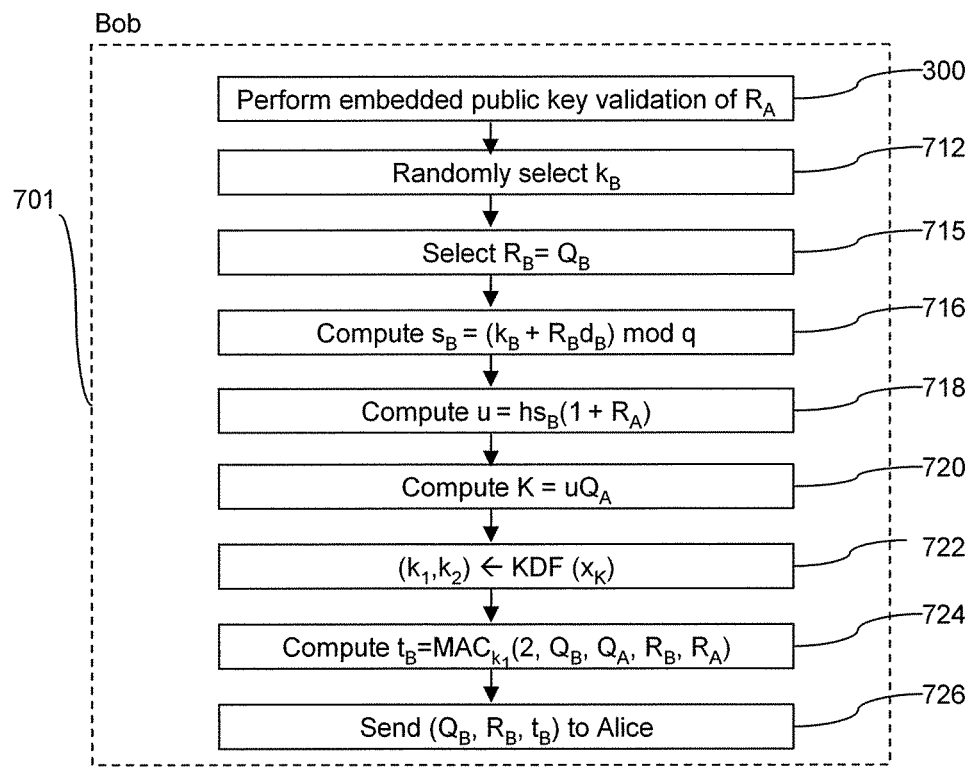
FIG. 6 is a flowchart showing details of the accelerated computation of the shared secret key from FIG. 4 performed by one correspondent.

However, if $Q_A$ and $R_A$ are identified as equal in the decision process (612) in FIG. 4, then Bob employs an accelerated scalar multiplication format (701). Referring to FIG. 6, first Bob performs embedded public key validation (300) of $R_A$, randomly selects $k_B$ between 1 to (q−1) (712), and then intentionally selects $R_B$ to equal $Q_B$ (715). The intermediate component $s_B$ (716), followed by the simplified factor $u=hs_B(1+\overline{R}_A)$ (718), are computed. This is used to compute the shared secret key $K=uQ_A$ using the simplified scalar multiplication format (720). Two keys, $k_1$ and $k_2$, are then derived using a KDF($x_K$) (722). Bob then computes the authentication tag $t_B$ using a MAC algorithm (724). He then sends $Q_B$, $R_B$, and $t_B$ to Alice (726).

It is appreciated that Bob may carry out a public key comparison (612) if he is not certain that Alice may intentionally set her ephemeral public key $R_A$ to equal her long-term public key $Q_A$. If Bob has determined that Alice's ephemeral and long-term public keys are identical, for example through some agreement established beforehand, then Bob may choose not to implement a public key comparison (612), thereby reducing the computational load. Therefore, upon receiving Alice's pair of public keys, Bob may directly employ an accelerated scalar multiplication format (701). That is, step 216 may proceed directly to step 701 if it is understood beforehand that the public keys are identical. It is understood that Alice may also choose not to perform a comparison (616), given that Alice knows beforehand that Bob has intentionally set his ephemeral and long-term public keys to be identical. Similarly, from steps 236 or 726 the algorithm may proceed directly to step 800. In the specific example referred to in FIG. 4, however, the determination is made by a comparison of both Alice and Bob.

Figure 7:
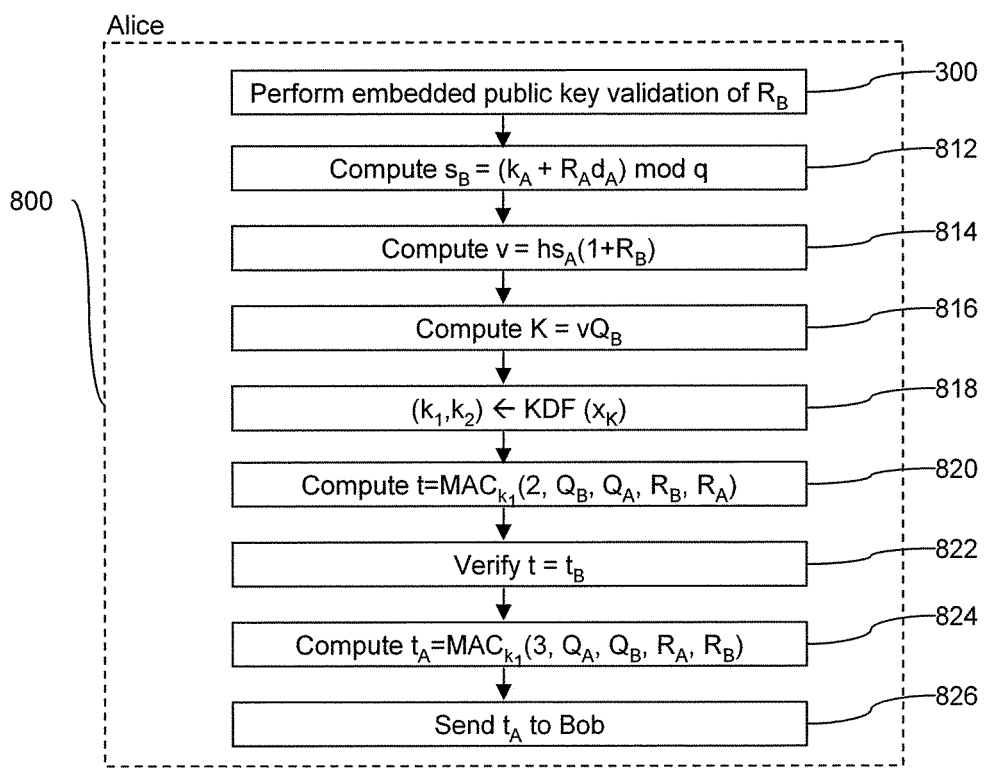
FIG. 7 is a flowchart showing details of the accelerated computation of the shared secret key from FIG. 4 performed by another correspondent.

Returning back to FIG. 4, upon receiving the pair of public keys from Bob, Alice begins to perform a series of instructions (614) by first comparing $Q_B$ and $R_B$ (616). If $Q_B$ does not equal $R_B$, Alice continues with the original set of steps 240, shown in detail in FIG. 2. However, if $Q_B$ and $R_B$ are equal, then Alice employs an accelerated scalar multiplication format (800). Referring to FIG. 7, first Alice performs embedded public key validation (300) of $R_B$. The intermediate values $s_A$ (812), followed by the simplified factor $v=hs_A(1+\overline{R}_B)$ (814), are computed. This is used to compute the shared secret key $K=vQ_B$ using the simplified scalar multiplication format (816). Two keys, $k_1$ and $k_2$, are then derived using a KDF($x_K$) (818). Alice then computes the authentication tag t using a MAC algorithm (820) and verifies that $t=t_B$ (822). Alice computes $t_A$ (824) and sends it to Bob (826).

Referring back to FIG. 4, after Alice completes her algorithm, (240) or (800), Bob performs a set of steps (260), in which he computes an authentication tag t in step 262 and verifies that $t=t_A$ (264). If all tags have been verified in the accelerated ECMQV process, then for both Alice and Bob the agreed session key is $k_2$ (270).

With regard to the embodiment described in FIG. 4, it is optional whether the ephemeral public keys (i.e. $R_A$ and/or $R_B$) are intentionally selected to be identical to the corresponding long-term public key. If not intentionally selected to be identical, then, for example, Alice's ephemeral public key may be determined by $R_A=k_A P$. Similarly, Bob may choose not to intentionally select a pair of identical public keys and, thus, may compute $R_B=k_B P$. However, it is noted that when a correspondent intentionally selects the ephemeral public key to be identical to the long-term public key, then the computation to obtain the ephemeral public key from the ephemeral private key is not required. Therefore, intentionally selecting identical public keys at a correspondent reduces the computational load in determining the ephemeral public key.

The condition of $R_B=Q_B$ and/or $R_A=Q_A$ may be detected during run-time and stored in advance in a fat certificate containing the long-term, public key Q and precomputed scalar multiples of Q. This pre-identified condition may be used to create a pre-computed table of multiples of the public key $Q_A$, which are combined to provide the scalar $uQ_A$. This will further accelerate the computation of the shared secret key K.

As may be appreciated from a consideration of FIG. 4, the ability to determine whether or not the public keys are the same offers versatility in communication between the correspondents. For example, Alice may use two different public keys but Bob may use identical public keys if more convenient. For example, if Bob is a computing device with limited computing power he may choose not to perform the scalar multiplication associated with the ephemeral public key.

Alice will ascertain this upon receipt of the data from Bob and can expedite the computation of the shared key.

Similarly, Alice may choose to use identical public keys, allowing Bob to expedite computation of the shared key, but Bob may choose to use different public keys for communicating with Alice.

Finally, both Alice and Bob may each choose to use respective identical public keys and each will expedite computation of the shared key.

It is possible for Alice and Bob to use their long-term private key $d_A$, $d_B$ respectively, in place of the ephemeral private key $k_A$, $k_B$ in computing their interim value $s_A$, $s_B$. However, this would result in identical keys being used in successive sessions, which generally is considered undesirable.

Figure 8A:
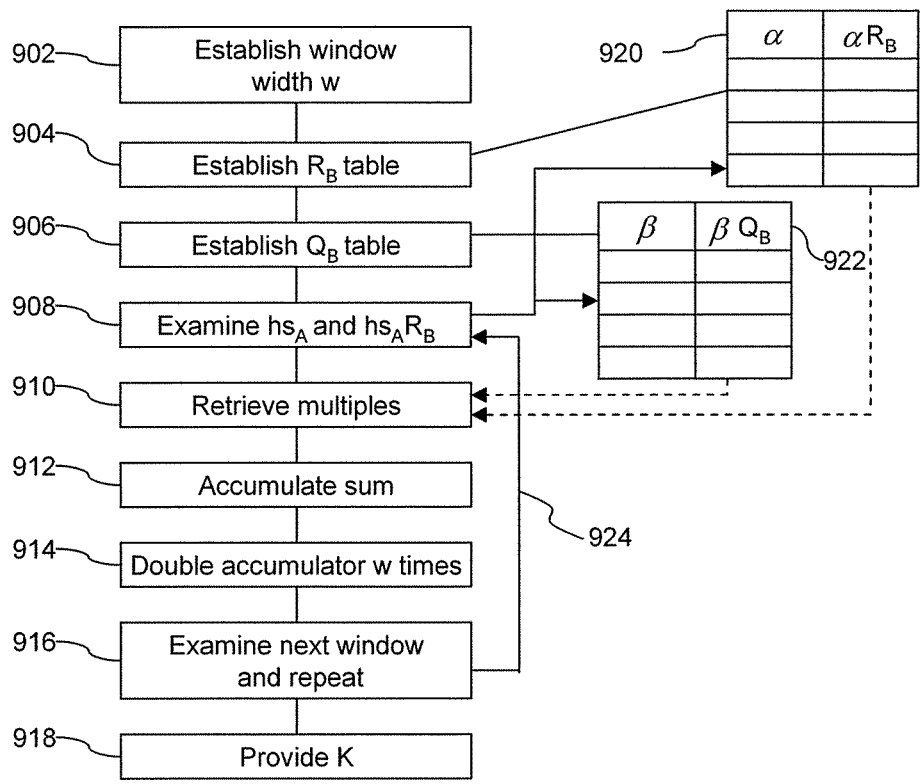
FIG. 8a is a flowchart showing a known method of simultaneous scalar multiplication using ECMQV protocols.

In another preferred embodiment of the method, tables may be used to further accelerate the MQV process. The cost savings gained by identifying pairs of identical public keys may be applied to the methods described for implementing simultaneous multiple point-multiplication. As shown in FIG. 8a, a method conventionally used to speed the computation is to employ multiple point-multiplication, also referred to as Shamir's trick. First, the original equation of the shared secret key (i.e. $K=hs_A(R_B+\bar{R}_B Q_B)$) must be rearranged to match the general linear combination form mP+lQ. The brackets are eliminated, giving $K=hs_A R_B+hs_A \bar{R}_B Q_B$, so that $m=hs_A$, $P=R_B$, $l=hs_A \bar{R}_B$, and $Q=Q_B$ in the representation of mP+lQ. As $R_B$ and $Q_B$ are both points, the expression for the key K is of the general form mP+lQ, that is the addition of two scalar multiples.

In FIG. 8a, a window width of a predetermined number of bits w is first established (902). Then a table (920) of small multiples of $\alpha$ of $R_B$ is established (904) and a table (922) of small multiples of $\beta$ of $Q_B$ is established (906). The table entries consist of a column of possible bit combinations (e.g. $\alpha=1001_2$), and a column of corresponding scalar multiples (e.g. $1001_2 R_B$). Then, the scalars $hs_A$ and $hs_A \bar{R}_B$ are examined (908) using windows of the window width w. The scalar multiples of $R_B$ and $Q_B$ corresponding to each window are retrieved from each respective table (910). The sum of the table entries from the two windows is added into an accumulator (912). The accumulator is then doubled w times in accordance with the width w of the window (914), and then the next window is examined (916). The scalars are repeatedly examined and table entries added into the accumulator and the accumulator doubled w times for each repetition as described above (924) until the shared secret K is computed (918). This format (i.e. $K=hs_A R_B+hs_A \bar{R}_B Q_B$) for simultaneous multiple point-multiplication provides a computational cost saving of 0.25 scalar multiplications over the computations shown in FIG. 3, thereby requiring a total of 1.25 scalar multiplications.

Figure 8B:
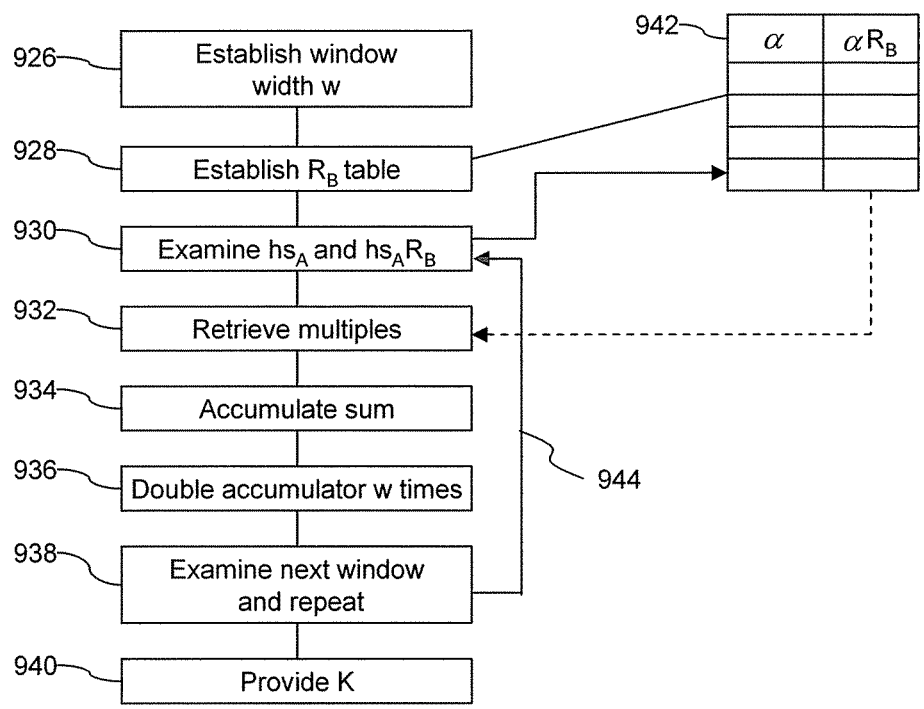
FIG. 8b is a flowchart showing an accelerated method of simultaneous scalar multiplication using the techniques of FIG. 6 and FIG. 7.

The above simultaneous multiple point-multiplication method may be further accelerated when a correspondent's pair of public keys are identical. In the computation shown in FIG. 8a, where different public keys are used, two tables (920, 922) are required to perform simultaneous multiplication. Referring to FIG. 8b, when the ephemeral public key and long-term public key identical, for example $R_B=Q_B$, only one table (942) is required by the correspondent to perform the window methods. Therefore, the accelerated simultaneous scalar multiplication (720, 816) begins by establishing a window width of w bits (926), then establishing a table of scalar multiples of $R_8$ (928). The scalars $hs_A$ and $hs_A \bar{R}_B$ are examined using windows of the window width w (930). The scalar multiples of $R_B$ that correspond to each window are retrieved (932) and stored into an accumulator (934). The accumulator is then doubled w times in accordance with the width w of the window (936), and then the next window is examined (938). The scalars are repeatedly examined and table entries added into the accumulator and the accumulator is doubled w times for each repetition as described above (944) until the shared secret K is computed (940).

It should be appreciated that the cost saving methods resulting from the use of identical public keys and applied to the tables used for simultaneous point-multiplication may also be applied to jointly constructed tables. Eliminating the need for constructing two separate tables or constructing a joint table for pairs of public keys $R_A$, $Q_A$ and $R_B$, $Q_8$ consequently reduces the run-time and may achieve cost savings considerably greater than 20%.

It should also be appreciated that the acceleration of the key agreement protocol using pairs of identical public keys is also applicable to implementations using multiplicative groups. The implementations described above utilise elliptic curve groups in which group operations are referred to by an additive notation. Other groups, such as the group Fp, which is the set of non-zero integers module p, use multiplicative notation. The additive notation in an elliptic curve setting is replaced by multiplicative notation in a multiplicative group setting.

Figure 9:
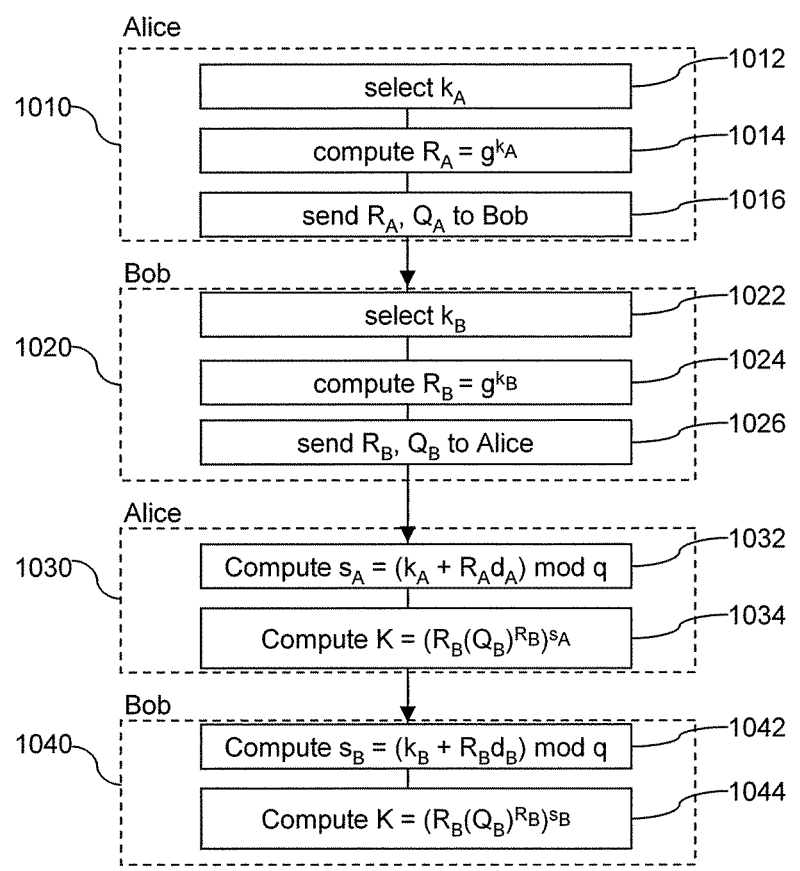
FIG. 9 is a flowchart showing a known method of key agreement using MQV protocols over multiplicative groups.

Referring therefore to FIG. 9, by way of background, the method for generally computing a shared secret key K using MQV in a multiplicative group setting is shown by the numeral 1000. In a set of actions by Alice (1010), an ephemeral private key $k_A$ is selected at random from the interval 1 to (q−1) (1012), where q is the order of the group. Alice computes the corresponding ephemeral public key $R_A=g^{k_A}$ (1014), where g is the group generator, and sends $R_A$ and long-tens public key $Q_A$ to Bob (1016). In a similar set of actions by Bob (1020), an ephemeral private key $k_B$ is selected at random from the interval 1 to (q−1) (1022). Bob computes the corresponding ephemeral public key $R_B=g^{k_B}$ (1024), and then sends $R_B$ and long-term public key $Q_B$ to Alice (1026). Alice then uses these keys in set of actions (1030) to compute interim value $s_A=(k_A+d_A\overline{R}_A) \bmod q$ (1032), followed by the exponentiation formula of the shard key $K=(R_B(Q_B)^{\overline{R}_B})^{hs_A}$ (1034), where h is the cofactor of the group. In numeral 1040, Bob computes interim value $s_B=(k_B+d_B\overline{R}_B) \bmod q$ (1042), which is used to compute the exponentiation formula of the shared secret key $K=(R_A(Q_A)^{\overline{R}_A})^{hs_B}$ (1044).

Figure 10:
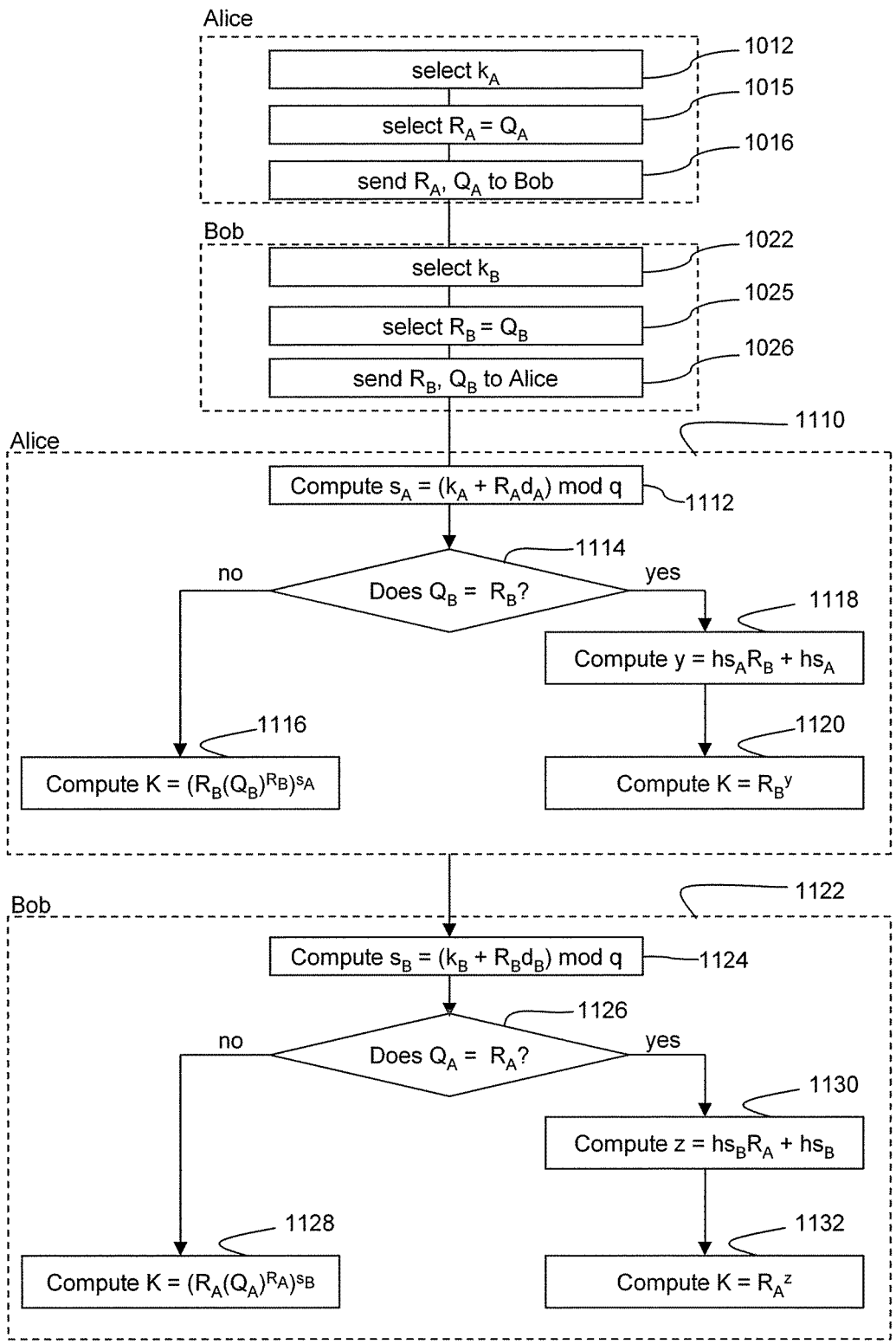
FIG. 10 is a flowchart showing an embodiment of accelerated key agreement using MQV protocols over multiplicative groups.

Referring to FIG. 10, an embodiment for accelerating the implementation of FIG. 9 for multiplicative groups is shown. Similar to the accelerated ECMQV described above, the number of intensive computations is reduced when the pair of public keys have the same value. In numeral 1012, Alice selects an ephemeral private key $k_A$ at random from the interval 1 to (q−1). Alice intentionally selects the ephemeral public key $R_A$ to equal long-term public key $Q_A$ (1015), and sends $R_A$ and $Q_A$ to Bob (1016). Similarly in numeral 1022, Bob selects an ephemeral private key $k_B$ at random from the interval 1 to (q−1). Bob intentionally selects the ephemeral public key $R_B$ to equal the long-term public key $Q_B$ (1025), and then sends $R_B$ and $Q_B$ to Alice (1026). At step 1110, Alice computes interim value $s_A=(k_A+d_A\overline{R}_A) \bmod q$ (1112) and then compares $R_B$ and $Q_B$ (1114). If Bob's pair of public keys are identical, such that $R_B=Q_B$, then Alice computes the accelerated exponentiation formula for the shared secret key by calculating the simplified exponent $y=hs_A\overline{R}_B+hS_A$ (1118) or $y=hs_A(1+\overline{R}_B)$, i.e. y is dependent on $(1+\overline{R}_A)$, then calculating the exponent $K=R_B^y$ (1120). Otherwise, if $R_B \neq Q_B$, then Alice computes the non-accelerated exponentiation formula of the shared secret key $K=(R_B(Q_B)^{\overline{R}_B})^{s_A}$ (1116). Similarly in numeral 1122, Bob computes interim value $s_B=(k_B+d_B\overline{R}_B) \bmod q$ (1124) and compares $R_A$ and $Q_A$ (1126). If Alice's pair of public keys are identical, such that $R_A=Q_A$, then Bob computes the accelerated exponentiation formula for the shared secret key by calculating the simplified exponent $z=hs_B\overline{R}_A+hs_B$ (1130) or $z=hs_B(1+\overline{R}_A)$, then calculating the exponent $K=R_A^z$ (1132). Otherwise, if $R_A \neq Q_A$, then Bob computes the non-accelerated exponentiation formula of the shared secret key $K=(R_R(Q_A)^{\overline{R}_A})^{s_B}$ (1128).

In the embodiment shown in FIG. 10, the comparison process (1114, 1126) may be required if Alice and Bob are uncertain if the other will use identical public keys. In the case when Alice and Bob are certain that pairs of identical public keys may be employed, then the comparison process (1114, 1126) may be avoided and the accelerated MQV protocol may be applied directly.

Another embodiment of the accelerated MQV method uses simultaneous exponentiation, analogous to the simultaneous multiple point-multiplication discussed above. The formula $K=(R_B(Q_B)^{\overline{R}_B})^{s_A}$ that is used to determine the key can be rearranged as $K=(R_B(Q_B)^{\overline{R}_B})^{s_A}=R_B^{s_A} Q_B^{\overline{R}_B s_A}$. This rearrangement allows the key to be computed by using a technique known as simultaneous multiple exponentiation, which uses only one set of squares.

Figure 11A:
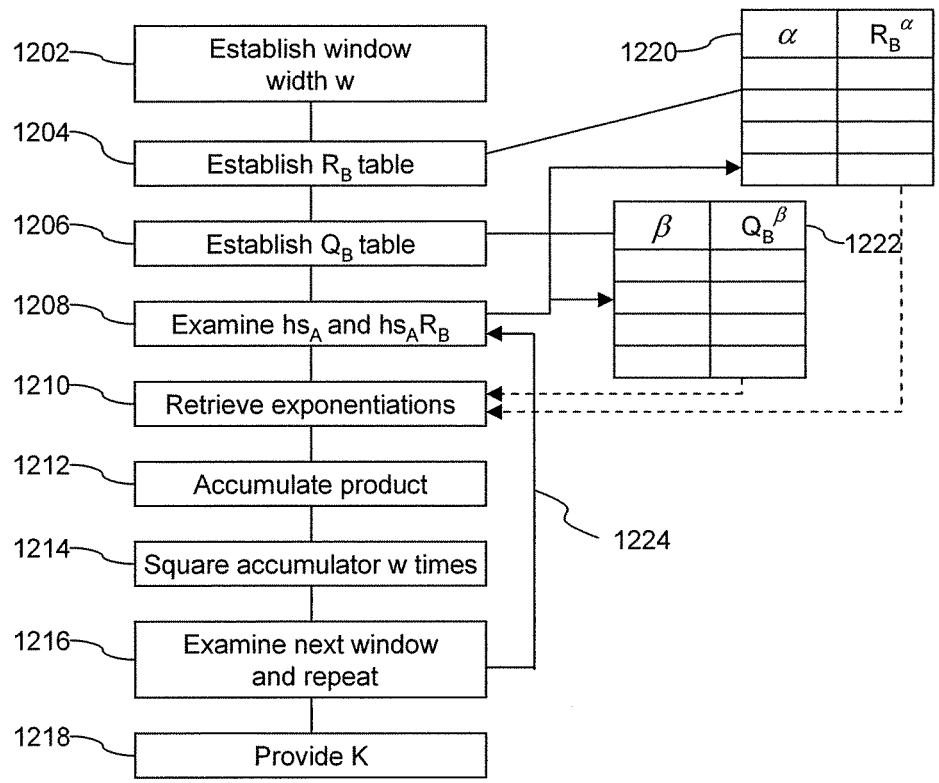
FIG. 11a is a flowchart showing a method of simultaneous exponentiation from FIG. 9.

Referring to FIG. 11a, a method of simultaneous multiple exponentiation is shown for two public keys of non-equal value. A window width of a predetermined number of bits w is first established (1202). Then a table (1220) of small exponents $\alpha$ of $R_B$ is established (1204) and a table (1222) of small exponents $\beta$ of $Q_B$ is established (1206). The table comprises a column of possible bit combinations (e.g. $\alpha=1001_2$) and a column of the values resulting from the corresponding exponentiations (e.g. $R_B^{1001_2}$). The exponents $hs_A$ and $hs_A\overline{R}_B$ are then examined using windows of the window width w (1208). The results of the exponentiation of $R_B$ and $Q_B$ by an exponent corresponding to each window are retrieved from each respective table (1210). The product of the table entries from the two windows is multiplied into an accumulator (1212). The value in the accumulator is then squared w times in accordance with the width w of the window (1214), after which the next window is examined (1216). The scalars are repeatedly examined, table entries multiplied and stored in the accumulator, and the accumulator squared w times for each repetition as described above (1224) until the shared secret K is computed (1218).

Figure 11B:
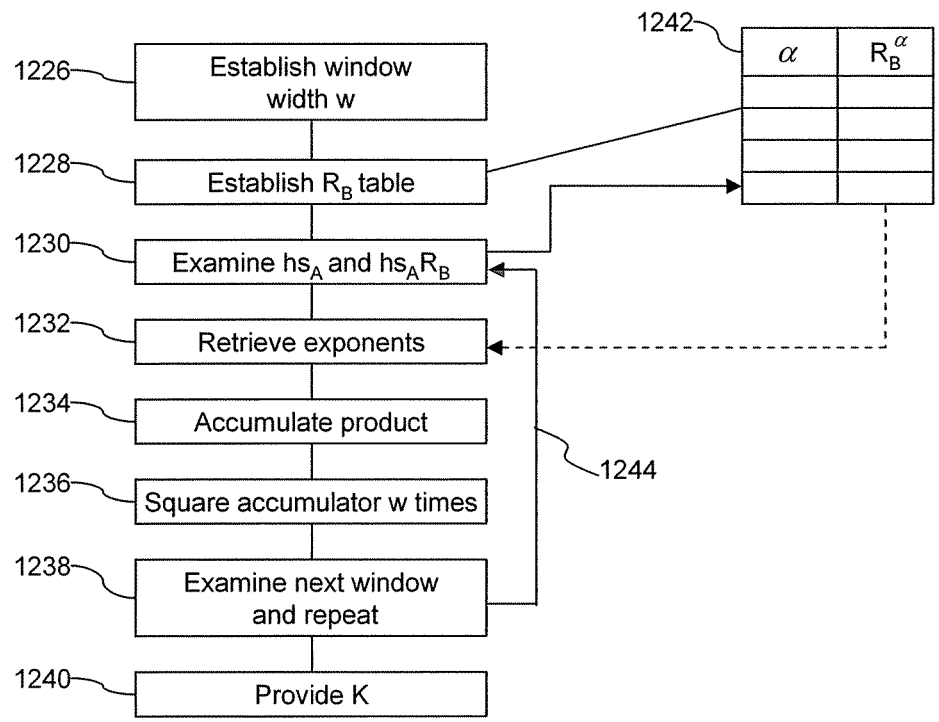
FIG. 11b is a flowchart showing a method of accelerated simultaneous exponentiation from FIG. 10.

Referring to FIG. 11b, a preferred embodiment of the accelerated MQV method eliminates one of the exponentiation tables (1222) if the pair of public keys are identical. In the situation of pairs of identical public keys, referring briefly to FIG. 10, steps 1120 and 1132 may use a corresponding accelerated algorithm described herein. In FIG. 11b the accelerated simultaneous exponentiation begins by establishing a window width of w bits (1226), followed by establishing a table of the result of exponentiation of $R_B$ by small exponents (1228, 1242). The exponents $hs_A$ and $hs_A\overline{R}_B$ are examined using windows of the window width w (1230). The powers of $R_B$ that correspond to each window are retrieved (1232) and stored into an accumulator (1234). The accumulator is then squared w times in accordance with the width w of the window (1236), and then the next window is examined (1238). The scalars are repeatedly examined and table entries added into the accumulator and the accumulator squared w times for each repetition as described above (1244) until the shared secret K is computed (1240).

Figure 12:
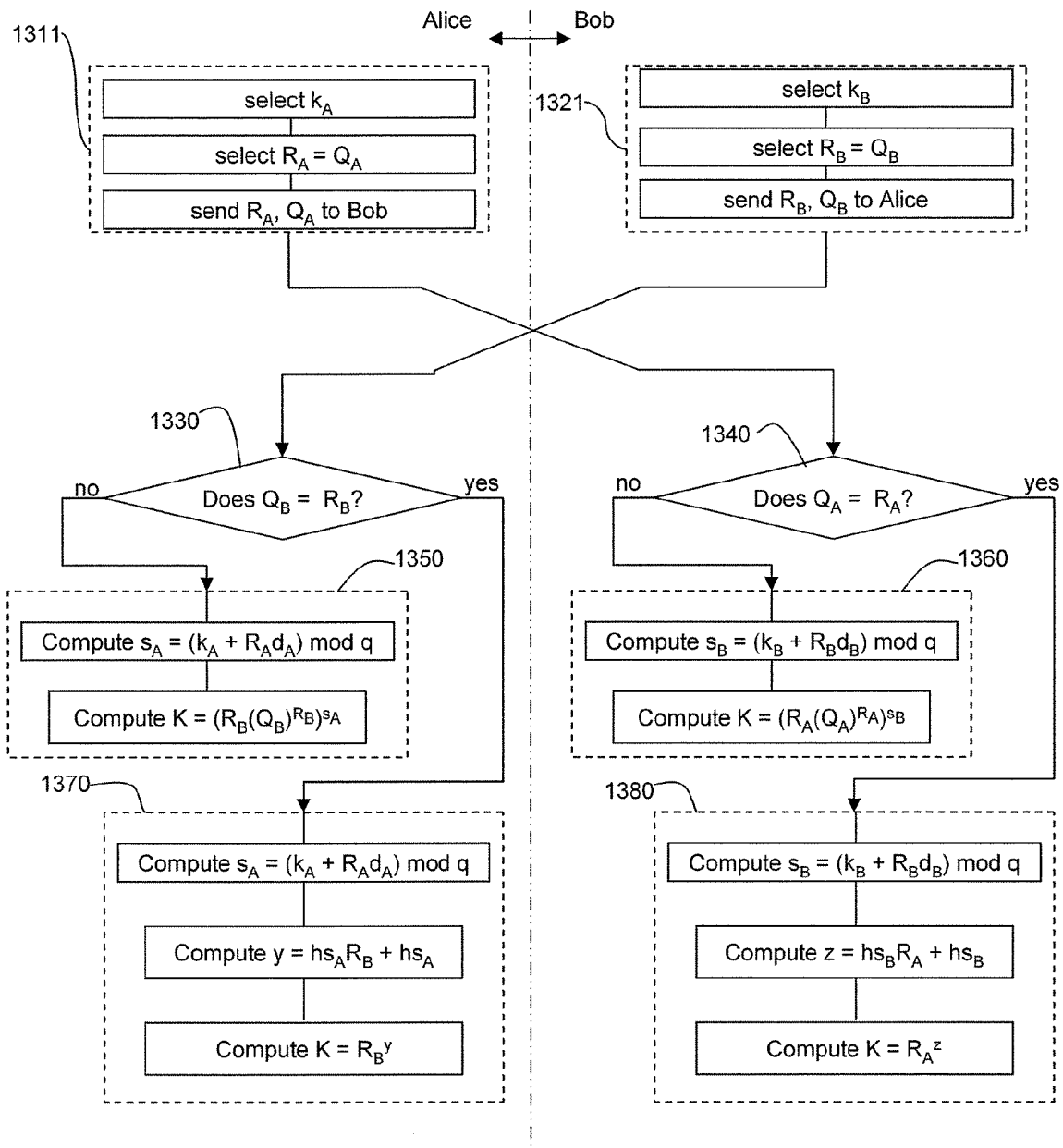
FIG. 12 is a flowchart showing an alternative embodiment of accelerated key agreement using the MQV protocol with parallel architecture.

It should be appreciated that different architectures of the accelerated MQV algorithm may be formed, which includes, for example, organizing the timing of the computations in order for the correspondents to perform sections of the algorithm in parallel. Referring to FIG. 12, one alternative embodiment of the parallel computation is shown for the case of accelerated MQV over multiplicative groups. Both Alice and Bob carry out a set of initial steps (1310, 1320) in parallel. Alice, in numeral 1311, randomly selects ephemeral private key $k_A$, selects ephemeral public key $R_A$ to equal long-term public key $Q_A$, and sends $R_A$ and $Q_A$ to Bob. Simultaneously, as Alice performs step 1311, Bob performs step 1321, such that $k_B$ is generated, $R_B$ is intentionally selected to equal $Q_B$, and then $R_B$ and $Q_B$ are sent to Alice.

In parallel, Bob and Alice both receive the other's pair of identical public keys. Then Alice determines if $Q_B=R_B$ (1330) in parallel to Bob, who also determines if $Q_A=R_A$ (1340). For Alice, after determining equivalency (1330), if $R_B \neq Q_B$, then Alice computes a non-accelerated exponentiation formula (1350) by first computing interim value $s_A$, then shared secret key $K=(R_B(Q_B)^{\overline{R}_B})^{s_A}$. However, if $R_B=Q_B$, Alice computes an accelerated exponentiation formula (1370), by first computing $s_A$, then $y=hs_A\overline{R}_B+hs_A$, and finally $K=R_B^y$. In parallel to Alice, after Bob determines equivalency (1340), if $R_A \neq Q_A$, then Bob computes a non-accelerated exponentiation formula (1360) by first computing interim value $s_B$, then shared secret key $K=(R_A(Q_A)^{\overline{R}_A})^{s_B}$. However, if $R_A=Q_A$, Bob computes an accelerated formula (1380), by first computing $s_B$, then simplified exponent $z=hS_B\overline{R}_A+hS_B$, and finally $K=R_A^z$. It should further be appreciated that the parallel computational arrangement also applies to accelerated MQV algorithms over elliptic curve groups.

It is noted that the comparison process in steps 1330 and 1340 may not be necessary if Alice and Bob know that an accelerated algorithm using pairs of identical keys is being used. In other words, Alice does not need to verify if Bob's keys pairs are identical (1330), if she already knows beforehand. Therefore, in the above case, from step 1320, the algorithm may proceed directly to step 1370. Similarly, from step 1310, the algorithm may proceed directly to step 1380.

In an alternative approach to the accelerated MQV protocols, a correspondent would be only required to send a single public key since the ephemeral and long-term public keys are identical. This would reduce the amount of data transferred between correspondents, allowing larger keys to be used.

Figure 13:
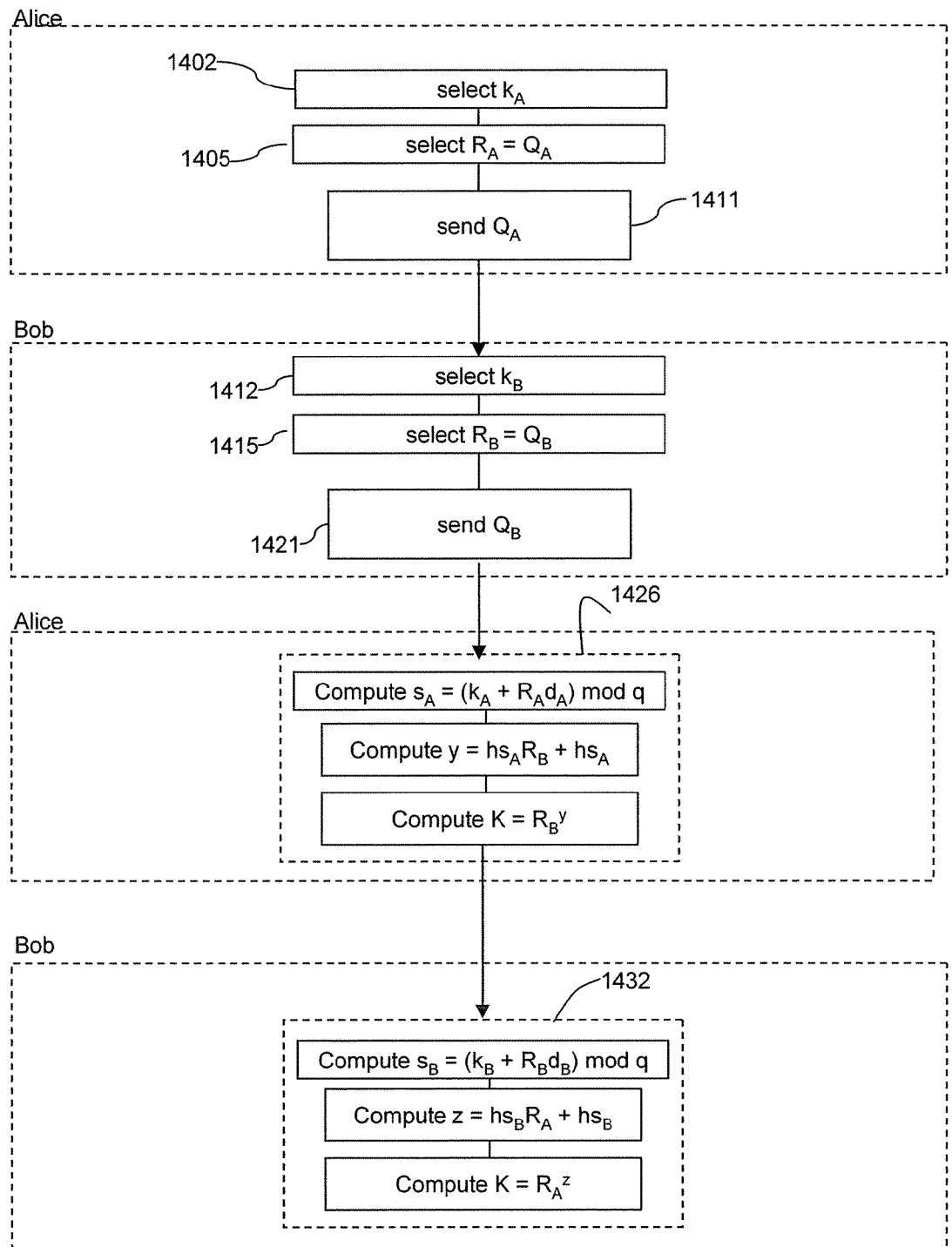
FIG. 13 is a flowchart showing an alternative embodiment of accelerated key agreement using an MQV protocol with single key transfer.

Referring to FIG. 13, an embodiment of an accelerated MQV protocol over multiplicative groups that sends only a single public key is illustrated. It is understood that both Alice and Bob know that an accelerated algorithm is implemented using identical public keys. Alice begins by randomly selecting $k_A$ (1402) and intentionally selecting $R_A=Q_A$ (1405). Alice then sends $Q_A$ to Bob (1411). This reduces the amount of data sent over the network compared to the data size of two public keys.

Continuing with FIG. 13, after the data from step 1411 has been sent by Alice, Bob proceeds to randomly select $k_B$ (1412) and intentionally selects $R_B=Q_B$ (1415). Similarly, Bob then sends $Q_B$ to Alice (1420). Alice then uses an accelerated MQV algorithm and calculates the intermediate component $s_A$, simplified exponent $y=hs_A \bar{R}_B + hs_A$, and finally the shared secret key $K=R_B^y$ (1426). It is appreciated that $R_B=Q_B$. In an analogous fashion, Bob uses the received data from step 1411 to compute the accelerated MQV algorithm. Bob calculates intermediate component $s_B$, simplified exponent $z=hs_B \bar{R}_A \alpha hs_B$, and finally the shared secret key $K=R_A^z$ (1432). It is noted that $R_A=Q_A$. It should be appreciated that this alternative approach described herein may also be applied over elliptic curve groups.

Figure 14:
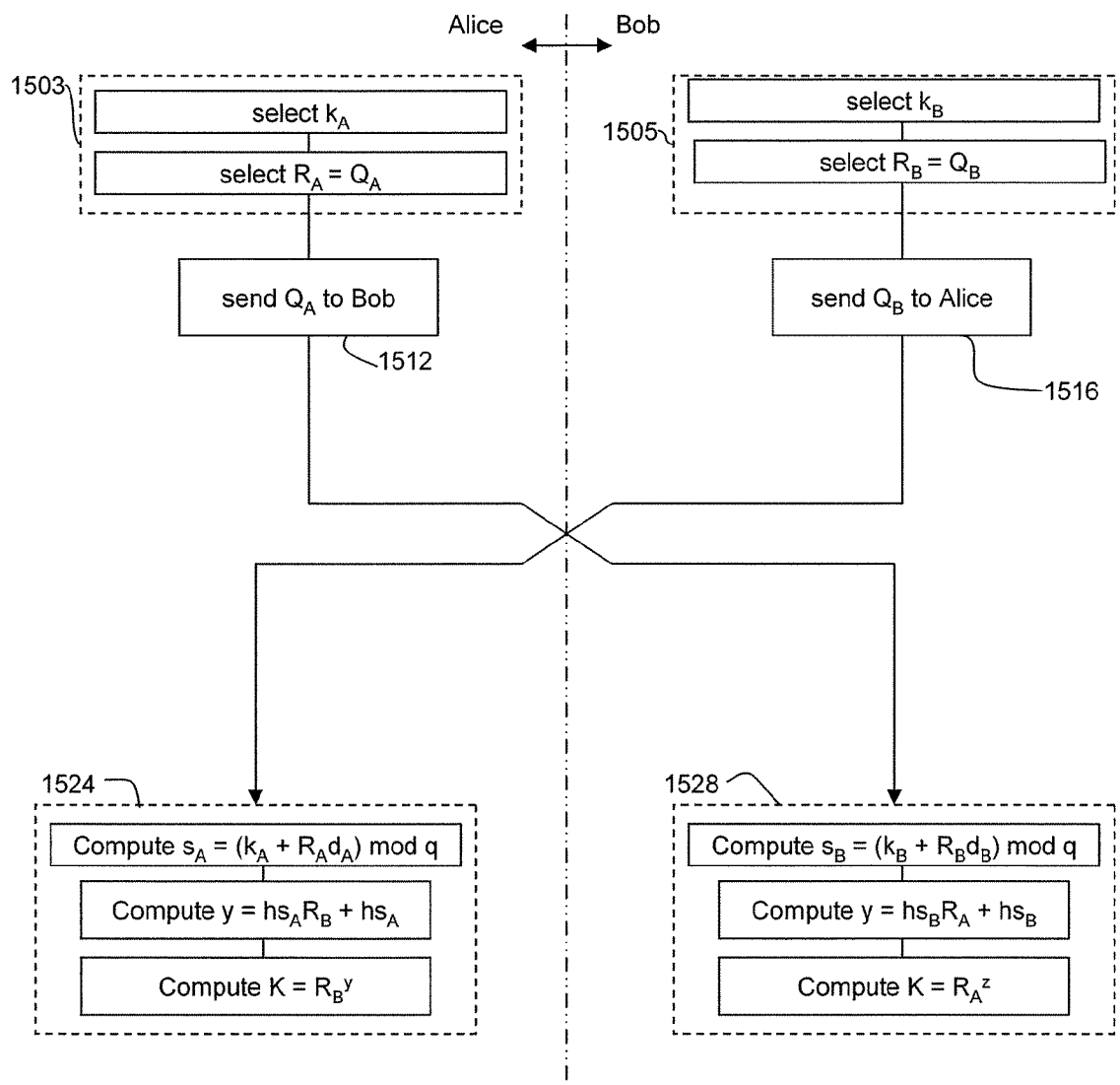
FIG. 14 is a flowchart showing an alternative embodiment of accelerated key agreement using MQV with parallel architecture and single key transfer.

The data size savings may also be applied in a parallel architecture for accelerated MQV algorithms. In yet another embodiment of the accelerated MQV algorithm, referring to FIG. 14, the parallel architecture is illustrated. Similar to the previously described embodiment, it is understood that both Alice and Bob know that an accelerated algorithm is implemented using identical public keys. Alice performs a set of steps (1503) in which she selects $k_A$ and intentionally selects $R_A=Q_A$. In parallel, Bob performs a set of steps (1505) in which he selects $k_B$ and intentionally selects $R_B=Q_B$. Then Alice sends $Q_A$ to Bob (1512), and Bob sends $Q_B$ to Alice (1516). Upon receiving the data, Alice computes shared secret key K using an accelerated algorithm (1524). In parallel, Bob computes shared secret key K using an accelerated algorithm (1528). It will be appreciated that the above single public key transfer for a parallel architecture in an accelerated MQV algorithm also applies to elliptic curve groups.

In an alternative approach to the accelerated MQV protocols, the verification of the correspondent's identical pair of public keys can take place on the same ALU that has generated the ephemeral public key. For example, after Alice computes $R_A$, she then proceeds to verify if $R_A=Q_A$. Benefits of this approach include the requirement of sending only a single public key, instead of two keys, to the correspondent if the pair of public keys are identical, which consequently reduces the required bandwidth of the network.

Figure 15:
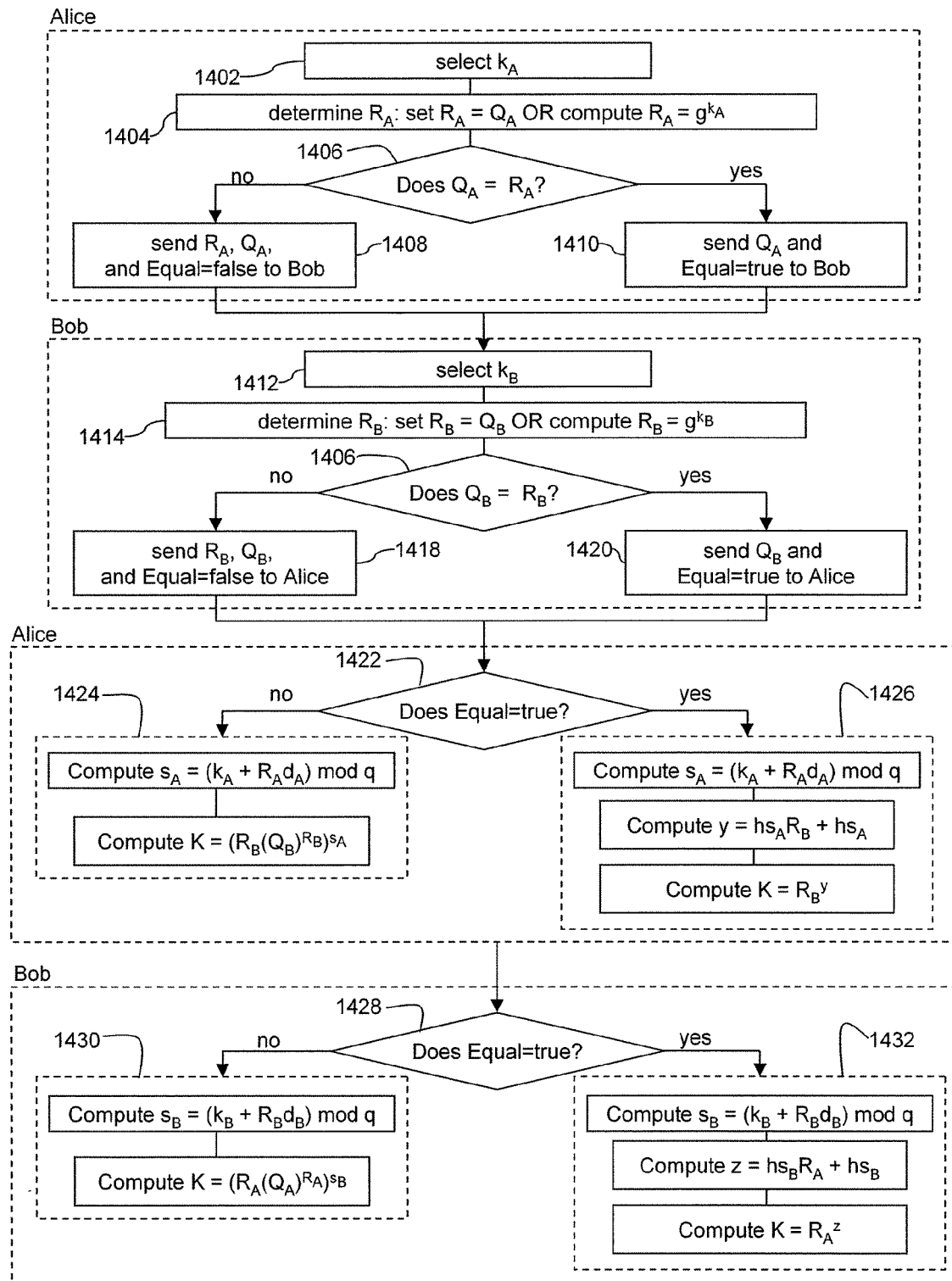
FIG. 15 is a flowchart showing an another alternative embodiment of accelerated key agreement using an MQV protocol with single key transfer.

Referring to FIG. 15, an embodiment of an accelerated MQV protocol over multiplicative groups that sends only a single public key is illustrated. In this embodiment, each correspondent has the option of intentionally selecting the ephemeral public key to be identical with the long-term public key. Alice begins by randomly selecting $k_A$ (1402) and determining $R_A$ (1404), either according to $R_A=Q_A$ or by computing $R_A=g^{k_A}$. Alice then determines if $Q_A=R_A$ (1406). If $Q_A \neq R_A$, then Alice sends $R_A$, $Q_A$ and Equal=false to Bob (1408); otherwise if $Q_A=R_A$, then Alice sends $Q_A$ and Equal=true to Bob (1410). The variable Equal may be a Boolean parameter of a small bit size, for example 1 bit, that indicates whether the pair of public keys are identical or not identical. In the situation when the pair of public keys are identical (i.e. Equal=true) only a single public key, such as the long-term public key, and the small bit-size parameter Equal is sent to the correspondent. This reduces the amount of data sent over the network compared to the data size of two public keys.

Continuing with FIG. 15, after the data from step 1408 or step 1410 has been sent by Alice, Bob proceeds to randomly select $k_B$ (1412) and determining $R_A$ (1414), either according to $R_B=Q_B$ or by computing $R_B=g^{k_B}$. Similarly, Bob then determines if $Q_B=R_B$ (1416). If $Q_B \neq R_B$, then Bob sends $R_B$, $Q_B$ and Equal=false to Alice (1418); otherwise if $Q_B$ $R_B$, then Bob sends $Q_B$ and Equal=true to Alice (1420). Alice then uses the received data from step 1418 or step 1420 to determine if Equal=true (1422). If Equal=false, Alice computes the shared key K using the non-accelerated MQV method (1424). If Equal=true, Alice uses an accelerated MQV algorithm and calculates the intermediate component $s_A$, simplified exponent $y=hs_A \bar{R}_B + hs_A$, and finally $K=R_B^y$ (1426). In an analogous fashion, Bob uses the received data from step 1408 or step 1410 to determine if Equal=true (1428). If Equal=false, Bob computes the shared key K using the non-accelerated MQV method (1430). If Equal=true, Alice uses an accelerated MQV algorithm and calculates $s_B$, interim value $z=hs_B \bar{R}_A + hs_B$, and finally $K=R_A^Z$ (1432). It should be appreciated that this alternative approach described herein may also be applied over elliptic curve groups.

Figure 16:
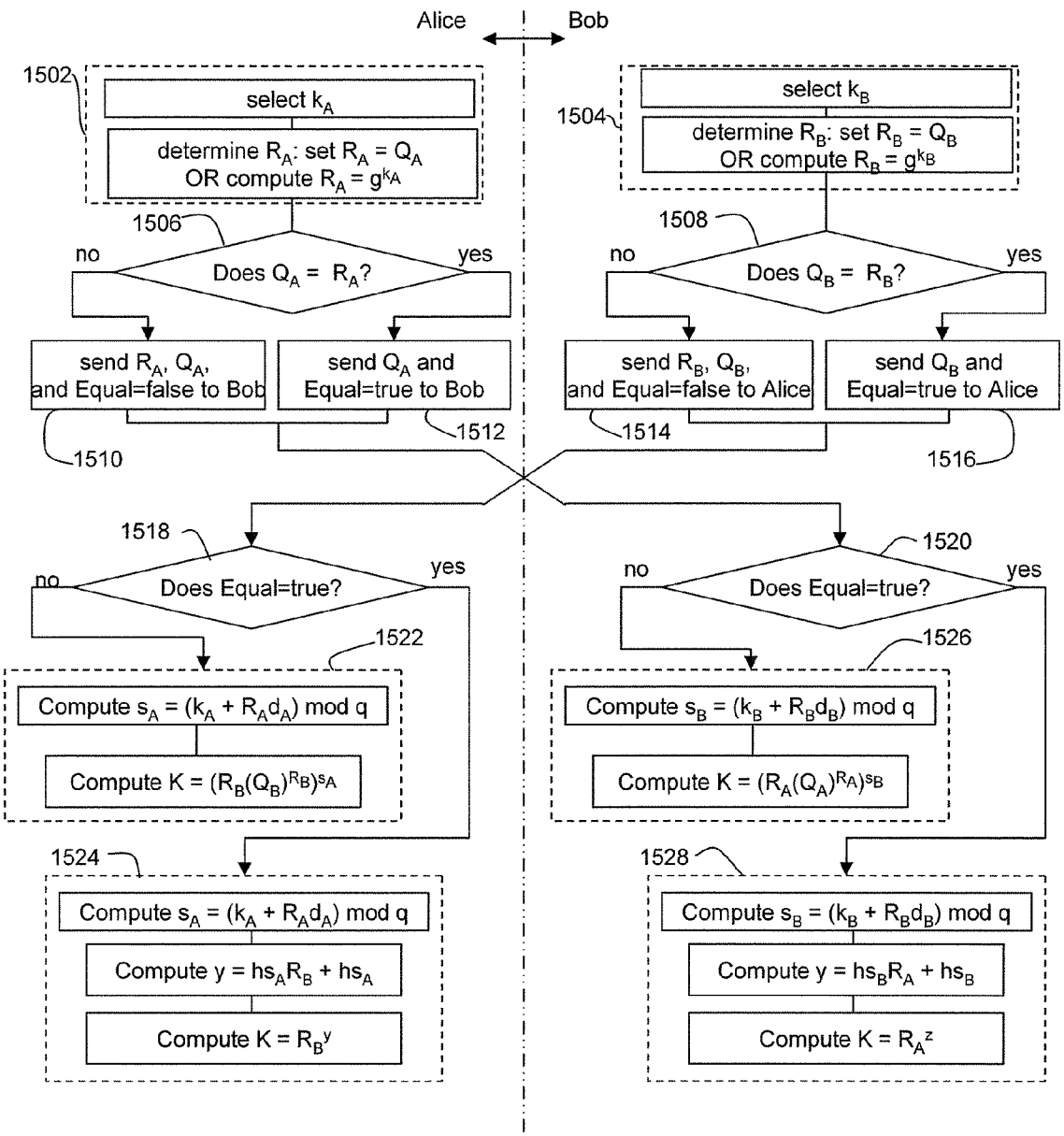
FIG. 16 is a flowchart showing an another alternative embodiment of accelerated key agreement using MQV with parallel architecture and single key transfer.

The data-size savings, resulting from the computation of an ephemeral public key and the determination of the respective identical key pair status by the same correspondent, may also be applied in a parallel architecture for accelerated MQV algorithms. In yet another embodiment of the accelerated MQV algorithm, referring to FIG. 16, the parallel architecture is illustrated. Alice performs a set of steps (1502) in which she selects $k_A$ and determines $R_A$. Alice may intentionally set $R_A=Q_A$ or compute $R_A=g^{k_A}$. In parallel, Bob performs a set of steps (1504) in which he selects $k_B$ and determines $R_B$. Bob may intentionally set $R_B=Q_B$ or compute $R_B=g^{k_B}$. Then both Alice and Bob simultaneously determine if their respective pair of public keys are equal (1506, 1508). If $Q_A \neq R_A$, Alice sends $R_A$, $Q_A$ and Equal=false to Bob (1510); otherwise if $Q_A=R_A$, then Alice sends $Q_A$ and Equal=true to Bob (1512). Similarly and in parallel, if $Q_B \neq R_B$, then Bob sends $R_B$, $Q_B$ and Equal=false to Alice (1418); otherwise if $Q_B=R_B$, then Bob sends $Q_B$ and Equal=true to Alice (1420). Upon receiving the data, both Alice and Bob determine in parallel if Equal=true (1518, 1520). For Alice, if Equal=false, then she computes shared secret key K using a non-accelerated algorithm (1522). Otherwise, if Equal=true, she computes shared secret key K uses an accelerated algorithm (1524). In parallel, continuing from step 1520 for Bob, if Equal=false, he computes shared secret key K using a non-accelerated algorithm (1526). Otherwise, if Equal=true, he computes shared secret key K using an accelerated algorithm (1528). It will be appreciated that the above single public key transfer for a parallel architecture in an accelerated MQV algorithm also applies to elliptic curve groups.

Each of the above examples indicates that the public keys are sent from one correspondent to the other. The long-term public keys may be obtained alternatively from a certificate authority, from directories or stored within the memory 30 from previous exchanges. Where only long-term public keys are used, therefore, the direct transfer of information between the correspondents may originate with the exchange of the MAC, $t_B$.

It is appreciated that the acceleration based on identical public keys is not limited to MQV algorithms. Other algorithms comprising a linear combination of an ephemeral public key and a long-term public key may also be suitable.

Figure 17:
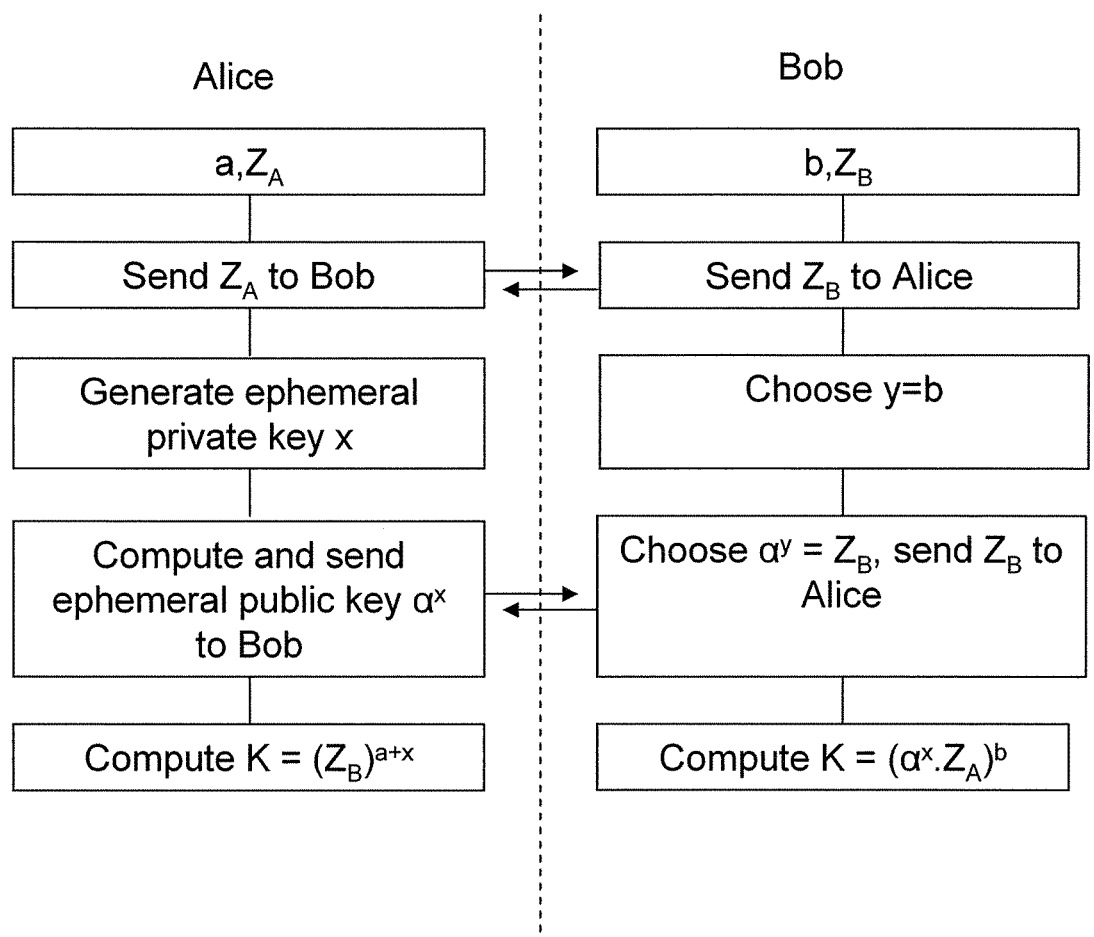
FIG. 17 is a flowchart showing an alternative embodiment of MTI protocol.

One class of such protocols are the MTI protocols, as described at page 518 of the Handbook of Applied Cryptology, Menzes et al. ISBN 0-8493-8523-7. As shown in FIG. 17, the MTI AO protocol may be implemented with Alice and Bob having respective long-term private/public keys a,$Z_A$ and b,$Z_B$ and the long-term public keys $Z_A$, $Z_B$ are exchanged with or made available to the other correspondent. Alice generates an ephemeral private key x, and computes a corresponding ephemeral public key, $\alpha^x$, which is sent to Bob.

Bob similarly would normally generate an ephemeral private key y and send the ephemeral public key $\alpha^y$ to Alice.

The shared key K is computed at Alice from $(\alpha^y)^a Z_B^x$ and at Bob from $(\alpha^x)^b Z_A^y$.

As shown in FIG. 17, Bob uses the long-term keys b, $\alpha^b$ as short term keys so that y=b and $\alpha^y=Z_B$, and notifies Alice either by sending $Z_B$ to Alice who can compare the values, or by sending an indication in the form of message Equal=true, or by prior agreement, such as during exchange of the long-term public keys.

Alice may the compute the shared key $K=(Z_B)^{a+x}$ as Alice knows both a and x, and Bob computes $(\alpha^x Z_A)^y$, as he knows b. One exponentiation is performed at both Bob and Alice to reduce the overall computational load.

Although the invention has been described with reference to certain specific embodiments, various modifications thereof will be apparent to those skilled in the art without departing from the spirit and scope of the invention. In addition although the various methods described are conveniently implemented in a general purpose computer selectively activated or reconfigured by software, one of ordinary skill in the art would also recognize that such embodiments may be carried out in hardware.

That which is claimed is:

1. A method of generating a shared key at one of a pair of correspondents participating in a public key cryptosystem, said shared key to be used by said one correspondent in communicating with another correspondent over a data communication channel, each of said correspondents respectively having a long-term private key and a corresponding long-term public key, and said shared key having the form of a combination of a long-term private key of one of said correspondents with a long-term public key and an ephemeral public key of another of said correspondents, said method comprising:
   a) said one correspondent obtaining said long-term public key of said other correspondent;
   b) said one correspondent determining whether said ephemeral public key of said other correspondent is the same as said long-term public key of said other correspondent;
   c) upon determining that said long-term public key and said ephemeral public key of said other correspondent are the same, said one correspondent utilising said long-term public key of said other correspondent as both said long-term public key and said ephemeral public key of said other correspondent in generating said shared key, and
   d) utilising said shared key to exchange information between said correspondents.

2. The method according to claim 1 wherein, upon determining that said long-term public key and said ephemeral public key of said other correspondent are the same, said one correspondent generates said shared key by computing an equivalent representation of said combination.

3. The method according to claim 2 wherein said shared key combines an intermediate value of said one correspondent with said long-term public key of said other correspondent, and said intermediate value binds said long-term private key and long-term public key of said one correspondent with an ephemeral private key of said one correspondent.

4. The method according to claim 3 wherein said cryptosystem is implemented over an additive group and said shared key is dependent on $(R_B+\overline{R}_B Q_B)$, where $R_B$ is an ephemeral public key of said other correspondent, $Q_B$ is a long-term public key of said other correspondent and $\overline{R}_B$ is an integer derived from $R_B$, and said method further includes the step of said one correspondent computing said shared key K from an equivalent representation having the form $vQ_B$, where v is dependent on $(1+\overline{R}_B)$.

5. The method according to claim 4 wherein said shared key is generated according to an ECMQV key agreement protocol and has the form $K=hs_A(R_B+\overline{R}_B Q_B)$ where h is the cofactor of the elliptic curve group and $s_A$ is said intermediate value, said method further including the step of computing said shared key K as $vQ_B$ where $v=hs_A(1+\overline{R}_B)$.

6. The method according to claim 3 wherein said shared key is generated according to an MQV key agreement protocol implemented over a multiplicative group and requires a shared key of the form $K=(R_B(Q_B)^{\overline{R}^B})^{s_A}$ where
   $R_B$ is the ephemeral public key of the other correspondent,
   $Q_B$ is the long-term public key of said other correspondent,
   $\overline{R}_B$ is an integer derived from said ephemeral public key, and
   $s_A$ is said intermediate value, said method further including the step of computing said shared key as $Q_B^y$, where $y=hs_A Q_B+hs_A$ and h is the cofactor of the group.

7. The method according to claim 3 wherein said shared key is generated according to an MTI key agreement protocol and has the form $K=(\alpha^y)^a Z_B^x$ where
   $\alpha^y$ is an ephemeral public key of said other correspondent,
   $Z_B$ is a long-term public key of said other correspondent,
   x is an ephemeral private key of said one correspondent and
   a is a long-term private key of said one correspondent, and said method includes the step of said one correspondent computing said shared key as $K=(Z_B)^{a+x}$.

8. The method according to claim 2 including the step of comparing said short term public key and said long-term public key received from said other correspondent to determine if said keys are the same.

9. The method according to claim 2 including the step of examining a message received from said other correspondent for an indicator that said public keys are the same and computing said equivalent representation upon identifying said indicator.

10. The method according to claim 2 wherein said equivalent representation is a linear combination of said long-term public key and said method includes the steps of accumulating said shared key from precomputed values derived from said long-term public key.

11. The method according to claim 10 wherein said cryptosystem is implemented over an additive group and said precomputed values are multiples of said long-term public key.

12. The method according to claim 10 wherein said cryptosystem is implemented over a multiplicative group and said precomputed values are results of exponentiation of said long-term public key.

13. A cryptographic system having a pair of correspondents communicating over a communication link and sharing a shared key, at least one of said correspondents comprising a processor operable to generate said shared key according to the method of claim 1.

14. A cryptographic module associated with one correspondent in a cryptographic system, said cryptographic module comprising:

a controller;

a memory to store an ephemeral public key and a long term public key of another correspondent;

an arithmetic logic unit operable to generate a shared key from a combination of the ephemeral and long-term public keys of said other correspondent and a private key of the one correspondent; and a comparator operable to determine whether said ephemeral public key and long-term public key of said other correspondent are the same;

wherein said controller is operable to instruct said arithmetic logic unit to i) utilise said long-term public key as said ephemeral public key in the computation of said shared key when said comparator determines that said keys are the same and ii) compute said shared key.

15. The cryptographic module according to claim 14 wherein said controller is operable to direct said arithmetic logic unit to compute an equivalent representation of said combination in computing said shared key.

16. The cryptographic module according to claim 15 wherein precomputed values derived from said long-term public key of said other correspondent are stored in said memory and said arithmetic logic unit is operable to use said precomputed values in computing said shared key.

17. The cryptographic module according to claim 14 wherein said comparator is operable to compare a pair of values representing said long-term public key and said ephemeral key.

18. The cryptographic module according to claim 14 wherein said comparator is operable to compare an indicator with a known value.

* * * * *